US009773225B2

(12) United States Patent
Jeffries

(10) Patent No.: US 9,773,225 B2
(45) Date of Patent: Sep. 26, 2017

(54) APPARATUS, SYSTEM, AND METHOD FOR SOCIAL NETWORK JOB APPLICATIONS

(76) Inventor: James Jeffries, Salt Lake City, UT (US)

(*) Notice: Subject to any disclaimer, the term of this patent is extended or adjusted under 35 U.S.C. 154(b) by 263 days.

(21) Appl. No.: 13/247,745

(22) Filed: Sep. 28, 2011

(65) Prior Publication Data

US 2012/0023030 A1    Jan. 26, 2012

Related U.S. Application Data

(63) Continuation-in-part of application No. 13/154,267, filed on Jun. 6, 2011, now abandoned.

(60) Provisional application No. 61/351,716, filed on Jun. 4, 2010, provisional application No. 61/358,781, filed on Jun. 25, 2010.

(51) Int. Cl.
| | |
|---|---|
| *G06Q 10/10* | (2012.01) |
| *G06Q 10/06* | (2012.01) |
| *G06Q 10/08* | (2012.01) |
| *G06Q 10/00* | (2012.01) |
| *G06Q 30/02* | (2012.01) |
| *G06Q 50/00* | (2012.01) |

(52) U.S. Cl.
CPC .......... *G06Q 10/10* (2013.01); *G06Q 10/105* (2013.01); *G06Q 10/1053* (2013.01); *G06Q 50/01* (2013.01)

(58) Field of Classification Search
CPC ... G06C 50/01; G06Q 10/105; G06Q 10/1053
USPC .......................... 705/319, 320, 321, 1.1–912
See application file for complete search history.

(56) References Cited

U.S. PATENT DOCUMENTS

| | | | |
|---|---|---|---|
| 6,785,679 B1 | 8/2004 | Dane et al. | |
| 7,003,546 B1 * | 2/2006 | Cheah | 709/200 |
| 7,013,290 B2 | 3/2006 | Ananian | |
| 7,016,853 B1 | 3/2006 | Pereless | |
| 7,263,523 B1 | 8/2007 | Germscheid et al. | |
| 7,424,438 B2 | 9/2008 | Vianello | |
| 7,640,179 B1 | 12/2009 | Sachedina | |
| 7,711,573 B1 | 5/2010 | Obeid | |
| 7,778,973 B2 | 8/2010 | Choi et al. | |
| 7,797,181 B2 | 9/2010 | Vianello | |

(Continued)

OTHER PUBLICATIONS

Tate, Ryan "The Facebook Privacy Settings You've Lost Foreever", http://www.gawker.com, Dec. 16, 2009.

(Continued)

*Primary Examiner* — Jonathan Ouellette
(74) *Attorney, Agent, or Firm* — Kunzler Law Group

(57) ABSTRACT

An apparatus, system, and method are disclosed for social network job applications. A method for submitting a job includes receiving details for a job posting from a job poster and the job posting corresponds to an employment position. The method includes providing the job posting for viewing on a job board by one or more users of a social network. Each account includes a user profile storing user information. The method includes receiving a request from a user to apply for the employment position corresponding to the job board posting. The method also includes submitting a job application for viewing by the job poster. The job application includes at least a portion of the user information from the user profile corresponding to the user. At least a portion of the user information included in the job application is pulled from the user profile.

20 Claims, 19 Drawing Sheets

(56) References Cited

U.S. PATENT DOCUMENTS

| | | |
|---|---|---|
| 7,805,382 B2 | 9/2010 | Rosen et al. |
| 7,870,079 B2 | 1/2011 | McGovern et al. |
| 7,949,611 B1 | 5/2011 | Nielsen et al. |
| 7,966,369 B1 | 6/2011 | Briere et al. |
| 2004/0163040 A1 | 8/2004 | Hansen |
| 2005/0267766 A1 | 12/2005 | Galbreath et al. |
| 2005/0278205 A1 | 12/2005 | Kato |
| 2006/0265266 A1* | 11/2006 | Chen et al. ............... 705/9 |
| 2007/0162507 A1 | 7/2007 | McGovern et al. |
| 2007/0260599 A1 | 11/2007 | McGuire et al. |
| 2008/0250332 A1 | 10/2008 | Farrell et al. |
| 2008/0288311 A1 | 11/2008 | Nemtsev |
| 2009/0030985 A1 | 1/2009 | Yuan |
| 2009/0049070 A1* | 2/2009 | Steinberg .................. 707/101 |
| 2009/0171686 A1 | 7/2009 | Eberstadt |
| 2009/0171964 A1 | 7/2009 | Eberstadt et al. |
| 2009/0172783 A1 | 7/2009 | Eberstadt |
| 2009/0299785 A1* | 12/2009 | Savjani et al. ............... 705/7 |
| 2010/0005518 A1 | 1/2010 | Tirpak et al. |
| 2010/0088364 A1 | 4/2010 | Carter et al. |
| 2010/0153290 A1 | 6/2010 | Duggan |
| 2010/0161369 A1 | 6/2010 | Farrell et al. |
| 2010/0179916 A1 | 7/2010 | Johns et al. |
| 2010/0257023 A1 | 10/2010 | Kendall et al. |
| 2010/0262550 A1 | 10/2010 | Burritt et al. |
| 2010/0269158 A1 | 10/2010 | Ehler et al. |
| 2010/0312713 A1 | 12/2010 | Keltner |
| 2010/0312714 A1 | 12/2010 | Ourega |
| 2010/0318571 A1 | 12/2010 | Pearlman et al. |
| 2011/0153740 A1 | 6/2011 | Smith et al. |
| 2011/0191371 A1 | 8/2011 | Elliott |
| 2011/0191663 A1 | 8/2011 | Magas et al. |
| 2011/0196801 A1 | 8/2011 | Ellis et al. |
| 2011/0196802 A1 | 8/2011 | Ellis et al. |
| 2011/0197146 A1 | 8/2011 | Goto et al. |
| 2011/0238591 A1 | 9/2011 | Kerr et al. |

OTHER PUBLICATIONS

Opsahl, Kurt "How to Get More Privacy From Facebook's New Privacy Controls", http://www.elf.org, May 26, 2010.
U.S. Appl. No. 13/154,267 Office Action dated Mar. 15, 2013.
U.S. Appl. No. 13/154,267 Office Action, dated Oct. 16, 2013.
U.S. Appl. No. 13/154,267 Office Action, dated Nov. 6, 2014.
U.S. Appl. No. 13/154,267 Office Action, dated Jun. 29, 2015.

\* cited by examiner

| | Description | Years of Experience^ | Consulting Type^^ | Career Level Served^^^ |
|---|---|---|---|---|
| Industry Served:* | High Tech/Banking/Etc. | X | Advisory Services | Executive Management |
| | | X | | Middle Managment |
| | Add Industry | | | |
| Category of services:** | Accounting/Financing/etc | X | | |
| | | X | | |
| | Add Category | | | |
| Consulting Services Offered:*** | Strategy/IT/Design/etc | X | | |
| | | X | | |
| | Add Service | | | |

\* Industry Served – Drop Down to set parameters around scope
\*\* Category of Services – Drop Down to set parameters and scope
\*\*\* Consulting Services offered – Free Form
^ Years of Experience – add one decimal place to determine more or less the one year of focus
^^ Consulting Type drop down – Advisory Services, Staff Augmentation, or Outsourced Services
^^^ Career Level Served drop down – Chief Executive, Executive Management, Middle Management, Individual Contributor, or Entry Level

FIG. 8

| Professional Experience Matrix | | | |
|---|---|---|---|
| Category | Years of Experience | Services Description | Career Level Served |
| Industries Served: | | | |
| Industry 1 | # of Years | Services Type | Management Level |
| Industry 2 | # of Years | Services Type | Management Level |
| Industry 3 | # of Years | Services Type | Management Level |
| Category of Services: | | | |
| Category 1 | # of Years | Services Type | Management Level |
| Category 1 | # of Years | Services Type | Management Level |
| Category 1 | # of Years | Services Type | Management Level |
| Consulting Services Offered: | | | |
| Consulting Services 1 | # of Years | Services Type | Management Level |
| Consulting Services 2 | # of Years | Services Type | Management Level |
| Consulting Services 3 | # of Years | Services Type | Management Level |

1002 {
User's primary work location:
City: _____
Zip Code: _____
Country: _____

1004 {
Consultant Availability:
Are you currently available for work? (Yes or No)
When will you be available for new or additional assignments? (Enter Date)
Are you willing to take a part-time assignment? (Yes or No)

1006 {
Location and Travel Considerations:
Does the work you do require you to be at your customer's worksite? (Yes or No)
How fare are you willing to travel from your primary work location? (Enter Distance)
Are you willing to travel internationally? (Yes or No)
Do you have a current passport? (Yes or No)

1008 {
Consulting Type:
What type of consulting services do you most often perform? (Select Service)*
What type of consulting services do you prefer not to perform? (Select Service)**

1010 {
Teaming Considerations:
Are your services typically performed as part of a firm or are you an independent consultant? (Firm or Independent)
Does your firm typically supply all the resources for an assignment? (Yes, No, NA)
Would you be interested in being part of a team of consultants for team assignments? (Yes, Maybe, or No)
What is your preferred team size for the type of work you perform? (Select Team Size)***

\* Drop Down – Advisory Services, Staff Augmentation, Outsource Services, All Services
\*\* Drop Down – Advisory Services, Staff Augmentation, Outsource Services, None of the Above
\*\*\* Drop Down – <5, <10, <15, <20, >20, N/A

1102
- Firm Headquarters Location:
  City: _____
  Zip Code: _____
  Country: _____

1104
- Firm Resource Availability:
  Does your firm currently have resources available for work? [(Yes or No)]
  When is the firm available for new or additional assignments? [(Enter Date)]
  Is the firm willing to take a part-time assignment? [(Yes or No)]

1106
- Location and Travel Considerations:
  Does the work you do require you to be at your customer's worksite? [(Yes or No)]
  How fare are you willing to travel from your primary work location? [(Enter Distance)]
  Are your resources available to travel internationally? [(Yes or No)]
  Do they have a current passport? [(Yes or No)]

1108
- Consulting Type:
  What type of consulting services does your firm perform most often? [(Select Service)*]
  What type of consulting services does your firm prefer not to perform? [(Select Service)**]

1110
- Teaming Considerations:
  Are your services typically performed as part of a larger team or does your firm perform independently? [(Firm or Independent)]
  Does your firm typically supply all the resources for an assignment? [(Yes, No, NA)]
  Would your firm be interested in being part of a team of consultants for team assignments? [Yes, Maybe, or No]
  What is the firm's preferred team size for the type of work you perform? [(Select Team Size)***]

\* Drop Down – Advisory Services, Staff Augmentation, Outsource Services, All Services
\*\* Drop Down – Advisory Services, Staff Augmentation, Outsource Services, None of the Above
\*\*\* Drop Down – <5, <10, <15, <20, >20, N/A

FIG. 11

Dashboard Indicators:

| Availability Need Date: (select date) | Project/Contract Location (location) | Services Required Services Requested: (Drop Down – Advisory, Outsourced, and/or Staff Augment) | Filters: Industry Served: (Drop Down) Teaming Filter: (On or Off) |

1402

| Your Status | Credibility | Available | Work Radius | Consult Type | Teaming | | | |
|---|---|---|---|---|---|---|---|---|
| Self (the user) | Yes | 3/10/10 | In Range | Advisory | Independent Team Size: <10 | | | |

1404

| Connection | Credibility | Available | Work Radius | Consult Type | Teaming | Current Employer | Industry Served | Career Level |
|---|---|---|---|---|---|---|---|---|
| Member 1 | Yes | 4/1/10 | In Range | Advisory | Independent Team Size: <5 | Employer name | Industry Name | Management level |
| Member 2 | Yes | 3/1/10 | In Range | Outsourced | Independent Team Size: <20 | Employer name | Industry Name | Management level |
| Member 3 | Yes | 7/1/10 | In Range | Staff Augment | Independent Team Size: <10 | Employer name | Industry Name | Management level |
| Member 4 | No | 4/1/10 | Near Range | Advisory | Independent Team Size: N/A | Employer name | Industry Name | Management level |
| Member 5 | No | 6/15/10 | Exceeds Range | Staff Augment | Independent Team Size: <15 | Employer name | Industry Name | Management level |
| Member 6 | No | 1/1/11 | Exceeds Range | Advisory | Independent Team Size: N/A | Employer name | Industry Name | Management level |

| Your Status | Credibility | Availability | Radius of Work | Consulting Type | Teaming |
|---|---|---|---|---|---|
| Self (the user) | Yes | 3/20/10 | In Range | Advisory | Independent Team Size: <10 |

1602 brackets the above row.

| | |
|---|---|
| Position Title: | (text) |

| | | Corporate Logo |
|---|---|---|
| Industry: | (show industry) | |
| Category: | (show category) | |
| Skills Required: | (enter text) | |

Posting Description:
Illustrate text as entered
Enable scrolling up and down

| | |
|---|---|
| Employment Type: | (Drop Down – Full Time, Part Time, Contract, Temporary, Other) |
| Consulting Type or Employment role: | (Advisory, Outsource, Staff Augmentation, Other) |
| Teaming Attributes: What size: | (Seeking Individual, Seeking Team) (n/a, <5, <10, <20, >20) |
| Teaming Attributes: | (show text) |
| Pay Rate: | (show text) |
| Job Length: | (show text) |
| Travel Required: | (Yes/No) |
| Telecommute: | (Yes/No) |

1604 brackets the above section.

| | |
|---|---|
| Ad Posting Date: | (show date) |
| Need date: | (show date) |
| Position Location: | (show location) |

Apply with Detailed Profile — 1608

1606 brackets the Ad Posting section.

| Your Status | Credibility | Availability | Radius of Work | Consulting Type | Teaming |
|---|---|---|---|---|---|
| Self (the user) | Yes | 3/10/10 | In Range | Advisory | Independent Team Size: <10 |

Professional Introduction

Custom Text

Professional Experience Matrix

| Category | Years of Experience | Services Description | Career Level Served |
|---|---|---|---|
| Industries Served: | | | |
| Industry 1 | # of Years | Services Type | Management Level |
| Industry 2 | # of Years | Services Type | Management Level |
| Industry 3 | # of Years | Services Type | Management Level |
| Category of Services: | | | |
| Category 1 | # of Years | Services Type | Management Level |
| Category 1 | # of Years | Services Type | Management Level |
| Category 1 | # of Years | Services Type | Management Level |
| Consulting Services Offered: | | | |
| Consulting Services 1 | # of Years | Services Type | Management Level |
| Consulting Services 2 | # of Years | Services Type | Management Level |
| Consulting Services 3 | # of Years | Services Type | Management Level |

Detailed Resume

Custom Text

FIG. 17

APPARATUS, SYSTEM, AND METHOD FOR SOCIAL NETWORK JOB APPLICATIONS

CROSS-REFERENCE TO RELATED APPLICATIONS

This is a continuation-in-part of U.S. patent application Ser. No. 13/154,267 entitled "Apparatus, System, and Method for Providing a Social Network" and filed on Jun. 6, 2011 for James Jeffries which claims the benefit of U.S. Provisional Patent Application No. 61/351,716 entitled "Multi-Tiered Professional Networking Platform with the Integration of the Professional Experience Matrix and Con-sult Connect Dashboard" and filed on 4 Jun. 2010 for James Jeffries and also claims priority to U.S. Provisional Patent Application No. 61/358,781 entitled "Apparatus, System, and Method for Providing a Social Network" and filed on 25 Jun. 2010 for James Jeffries, which are each incorporated herein by reference.

FIELD

This invention relates to online job applications and more particularly relates to job applications on a social network.

BACKGROUND

Description of the Related Art

With the advent of the internet and personal computing devices social networking websites have helped to connect individuals throughout the world. Social networking websites have been used to provide easy and simple ways of staying in contact with friends and family as well as provide the ability to network with new people and create new relationships. Staying in contact and creating new relationships with people has provided a variety of benefits, not the least of which is networking for professional or employment purposes.

However, while social networking websites may help individual users stay in contact, which may or may not result in hearing about employment positions, they generally offer very little help in the actual application process. Potential employees or employers may hear about a new position or potential candidate through a social network but then the candidate is sent to a separate website or through a separate process to actually apply for the position. Because potential candidates must go through a separate process anyway, very little benefit is available to users by keeping profiles and other personal information up to date. Thus, social networks fail to motivate users to enter as much data, or keep the data up to date, and this in turn weakens the value of the social network both to the owner and to the social network users.

BRIEF SUMMARY

From the foregoing discussion, it should be apparent that a need exists for a method and apparatus that overcome the drawbacks found in social networks. Beneficially, such a method and apparatus would allow user data entered within the social network to be used in a job application.

The present invention has been developed in response to the present state of the art, and in particular, in response to the problems and needs in the art that have not yet been fully solved by currently available social networking methods. Accordingly, the present invention has been developed to provide a method and apparatus for social networks that overcome many or all of the above-discussed shortcomings in the art.

A method for submitting a job application on a social network is discussed. The method may include receiving details for a job posting from a job poster and the job posting may correspond to an employment position. The method may include providing the job posting for viewing on a job board by one or more users of a social network. The one or more users may have accounts on the social network. Each account may include a user profile storing user information. The social network may allow the forming of connections between specific accounts. The method may include receiving a request from a user to apply for the employment position corresponding to the job board posting. The method may also include submitting a job application for viewing by the job poster. The job application may including at least a portion of the user information from the user profile corresponding to the user, wherein the at least a portion of the user information is pulled from the user profile.

In one embodiment, the social network may include the job board. In one embodiment, the job posting may include a job posting on a job board that is independent of the social network. In one embodiment, the user information included in the job application may include work qualification information, work experience information, a cover letter, and/or a resume of the user.

In one embodiment, the method includes displaying a draft view of the job application. In one embodiment, the method includes allowing the user to modify a portion of the draft view of the job application prior to submission. In one embodiment, the method includes allowing the user to upload one or more files to be included as part of the job application.

In one embodiment, the submitting of the job application includes logging an identifier of the user account corresponding to the user. In one embodiment, after the job application is submitted at least a portion of the job application is dynamically updated to reflect changes made to the user information stored in the user profile. In one embodiment, the account and the user profile corresponds to a single individual. In one embodiment, the account and the user profile corresponds to one of a team and a firm.

In one embodiment, the request from the user to apply for the employment position includes receiving a request form one or more users to apply as a group. In one embodiment, the job application includes information from a plurality of user accounts corresponding to the team.

In one embodiment, the forming of connections changes a level of permissions between the specific accounts. In one embodiment, the job application includes a resume created from the user profile of the user. In one embodiment the job application includes one or more media files. In one embodiment, the job application includes information linking to an online file or website. In one embodiment, the method includes receiving a request from the user to view the job board posting and providing the job posting for viewing to the user. In one embodiment, the method includes receiving the user information from the user and storing the received information in the user profile that corresponds to the user.

A method for comparing two sets of data on a social network is discussed. The method may include receiving a first set of data that includes details regarding a job position. The details may include two or more job requirements. The method may include receiving a second set of data that includes user information pulled from a user profile of an account on a social network. The method may include comparing two or more items of information in the first set of data to two or more items of information in the second set of data and determining a degree of match. The method may also include returning two or more indicators, the two or more indicators visually conveying the degree of match between the two or more items of information in the first set of data and the two or more items of information in the second set of data.

In one embodiment, the first set of data corresponds to data entered based on a search for individuals by a potential employer. In one embodiment, the first set of data corresponds to data in a job posting. In one embodiment, the two or more indicators are displayed as a portion of a job application.

A method for displaying work experience of a team or individual on a social network is also discussed. The method may include pulling work experience information from a user profile of an account on a social network. The work experience information may include work experience stored in abstracted levels. The method may include displaying a first abstract level of work experience that includes one or more broad descriptions of work experience at the first abstract level and a duration corresponding to each broad description. The method may include displaying a second abstract level of work experience that includes one or more specific descriptions of work experience at the second abstract level and a duration corresponding to each specific description. The first abstract level and second abstract level may be grouped separately from each other and simultaneously displayed as a portion of a job application. The first abstract level of work experience may include a higher level of abstraction while the second level of work experience may include a lower level of abstraction References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8 is an exemplary webpage view illustrating one embodiment for entering work experience data in accordance with the present invention;

FIG. 9 is an work experience view illustrating one embodiment for displaying work experience data in accordance with the present invention;

FIG. 10 is an exemplary webpage view illustrating one embodiment for entering individual dashboard attributes data in accordance with the present invention;

FIG. 11 is an exemplary webpage view illustrating one embodiment for entering a firm's dashboard attributes data in accordance with the present invention;

FIG. 14 is an exemplary view of a dashboard attribute search page in accordance with the present invention;

FIG. 16 is an exemplary view of a job posting in accordance with the present invention;

FIG. 17 is an exemplary view of a resume in accordance with the present invention;

DETAILED DESCRIPTION

Figure 1:
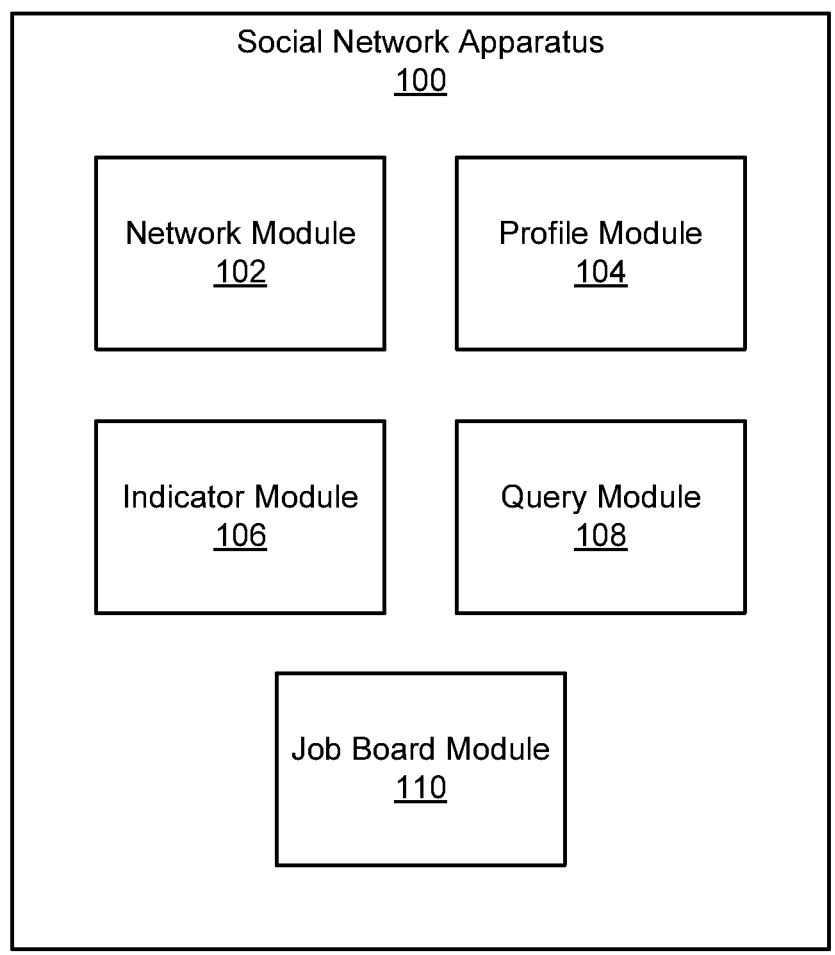
FIG. 1 is a schematic block diagram illustrating one embodiment of an apparatus for providing a social network in accordance with the present invention.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Social networks generally include a theoretical structure that controls, or reflects, the ways users interact. Generally, the structure of social networks includes a plurality of nodes (accounts) and a plurality of ties (connections) between the nodes. The nodes often represent a user, such as an individual or entity, while the ties between the nodes often represent some type of connection or relationship between the nodes. In some social networks the ties may reflect friendship, employment, acquaintanceship, or some other type connection or relationship. These social networks may then allow one node, or user, to take advantage of these ties by offering related services.

Although the following disclosure will concentrate on embodiments applicable to a social network for consultants and customers of consultants, one of skill in the art will understand that the principles and teachings provided herein may apply to a variety of other environments and situations as well.

FIG. 1 is a schematic block diagram depicting an exemplary social network apparatus 100 for providing a social network. The social network apparatus 100, as depicted, includes a network module 102, a profile module 104, an indicator module 106, a query module 108, and a job board module 110. A brief description of each module 102-110 will be provided followed by additional description in relation to the remaining figures.

The network module 102 may manages and/or provide the nodes and ties (connections) of a social network and may facilitate the basic structure of the social network. The network module 102, according to one embodiment, provides and/or manages one or more accounts that may act as nodes on a social network. According to one embodiment, the network module 102 provides a variety of account types. The network module 102 may provide and/or manage ties, or connections, between the accounts. The network module 102 may allow or restrict how, when, and by whom connections are formed. For example, an account of one type may not be allowed to initiate a connection with an account of another type. The network module 102 may also limit the visibility of accounts to other accounts.

Additionally, sub-networks and/or accounts of different types within a social network may have unequal levels of permissions. For example, an account of a first account type may have a first level of access to an account of a second account type while the account of the second account type may have a second level of access to the account of the first account type. The first level of access and the second level of access such that accounts of different types may be able to see varying amount of details in relation to each other. For example, a first account may not be allowed to see that a second account exists while the second account is allowed to see the existence of the first account. The level of access may vary in relation to visibility of information in a profile, ability to initiate connections, etc.

In some embodiments, further account types and/or levels of access may be present in some embodiments. For example, a third, fourth, fifth, or more types of accounts may be present in some embodiments. Similarly, additional levels of access may be present in some embodiments.

The profile module 104 manages profiles that correspond to accounts. The profiles module 104 may provide features that allow entry of information that correspond to a user of a specific account. For example, the profile module 104 may allow entry of a user's work experience, current work attributes or desires, personal information, public information, etc. The profile module 104 may provide different features or different types of profiles depending on the type of account. The profile module 104 may also provide features that combine data provided by an individual to create a portion of a resume.

The indicator module 106 creates indicators that reflect the degree of similarity or matching between at least two sets of data. According to one embodiment, the indicator module 106 compares an attribute or an item of work experience data with a requirement for employment. The indicator module 106 may then return an indicator that reflects the degree of similarity. The indicator may include a color, a number, a word, a graph, or other graphic that indicates how well the two sets of data match.

The query module 108 provides features that allow for searches to be made against one or more accounts, or other sets of data, to locate accounts or data that corresponds to the search. The query module 108 may provide an interface that allows a search to be made against one or more accounts based on work experience, or other attributes of a user. The query module 108 may also allow a search for a job posting on a job board that corresponds to a set of requirements, or attributes of a user.

The job board module 110 provides a job board that may be used by potential employers to locate skilled individuals or firms as well as by individuals or firms to locate employment. The job board module 110 may provide features allowing a potential employer to post details regarding an employment position or project which then may be available for others to see and apply. The posted position or project may be directed towards finding individuals to provide consulting services or towards finding a complete team. The job board module 110 may also provide features allowing a potential employee, firm, or team to apply for the position and may pull data from an account to provide the details for a job application. The job board may be used to post requests for one time services, contract positions, or long term employment. The job board may allow for the posting of a job posting that may require a team of individuals. For example, the job posting may allow multiple individuals to apply to fulfill separate aspects of the job posting. The poster of the job may then be able to select one or more individuals to fulfill the job requirements as a team. The depicted social network apparatus 100 and modules 102-110 are exemplary only and illustrate only one of many possible embodiments. Other embodiments may include only one of the modules 102-110, or any combination of the modules 102-110. Additionally, in some embodiments, the modules 102-110 may operate separate from the social network apparatus 100. For example, a system that includes one or more of the modules 102-110 may be used to provide functionality similar to the social network apparatus 100.

Figure 2:
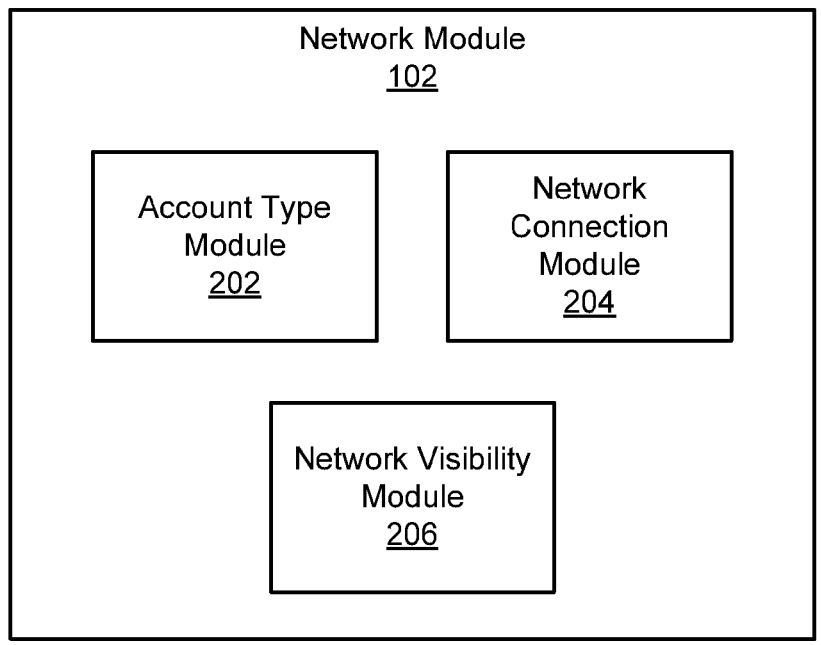
FIG. 2 is a schematic block diagram illustrating one embodiment of a network module in accordance with the present invention.

Turning now to FIG. 2 a schematic diagram of one embodiment of a network module 102 is shown. The network module 102 is configured to provide a social network structure that includes a plurality of accounts (nodes) and connections (ties). The network module 102 regulates the type of accounts, the connections between accounts, and the visibility of accounts to others within and outside the social network. The network module 102 as depicted includes an account type module 202, a network connection module 204, and a network visibility module 206.

The account type module 202, according to one embodiment, allows one or more account types to be created. The account types may have varying features or attributes that allow different account types to behave differently on a social network. The account type module 202 may have access to a data store for accessing or storing information regarding the type of an account.

According to one embodiment, an individual attempting to access a social network website will be prompted to create an account or provide login details. If the individual does not yet have an account, the account type module 202 may allow the individual to proceed through a registration process to create an account. In some embodiments, a plurality of account types may be available. Some account types may allow immediate online creation while other account types may require creation in another manner, such as by telephone or in person.

According to one embodiment, a person's or entity's identity may be verified to determine the account user's level of credibility. In one embodiment, the level of credibility may be evaluated before the individual or entity is allowed to create an account. In one embodiment, an account may be created prior to verification but various features may be disabled until a person's or entity's identity is verified. In one embodiment, one or more details besides identity may be verified prior to account creation or enablement of features. For example, a background check, employment verification, employment history verification, or other details with regard to an individual or entity may be verified. The identity or details may be verified by an owner of a social network or by some other third party.

In one embodiment, having a third party perform an evaluation of an individual on the social network may allow for significant level of trust. For example, if an account simple endorsements from other accounts or individuals on the social network may not be as trustworthy because the credibility of the endorsing account may not be verifiable. Thus, you may have two unknowns endorsing each other with no real way of verifying that the individuals or entities are who they say they are. Third party verification by the owner of the social network or some other entity may help customers or those seeking goods or services to receive have trust that the details of a profile or job application are accurate.

The network connection module 204 manages network connections (ties) between accounts on a social network. The network connection module 204 may allow one or more connection types between accounts. The network connection module 204 may restrict the creation of a connection based on the account type initiating a connection, the account type being solicited for a connection, existing connections between accounts, and the method used to create the connection. According to one embodiment, the connections between accounts are stored in a data store accessible by the network connection module 204. According to another embodiment, the connections of a given account are stored in that account.

In one embodiment, the network connection module 204 allows unequal permission to form or initiate connections between accounts of different types. For example, an account of a first account type may not be allowed to initiate a connection with an account of a second account type while the account of the second account type is allowed to initiate a connection with the account of the first account type.

In one embodiment, different methods of initiating a connection may be available. For example, one account may be able to initiate a connection with any other account it can see as existing through the social network or the account may be able to send an email request to connect to any email address. In one embodiment, a user of one account type may send an email to another individual or entity for whom the user has an email address despite whether or not the user knows if the other individual or entity has a social network account. Upon receipt of the email request, the other individual or entity may accept or deny the request by adding the connection to an existing account (such as an account the individual or entity already has on the social network) or by creating a new account.

The network visibility module 206 manages the visibility of accounts to other accounts in the social network. The network visibility module 206 may also manage the visibility of accounts from outside the social network. According to one embodiment, the network visibility module may regulate whether an account can be seen to exist by another account. According to one embodiment, the network visibility module may regulate whether at least a portion of a profile corresponding to the account is at least partially visible to another account.

According to one embodiment, the network visibility module 206 allows different account types to have different visibility within the network. For example, a second account type may be able to see a first account type while the first account type may not be able to see the second account type. According to one embodiment, the network visibility module 206 allows visibility based on connections between accounts. According to one embodiment, an account may be visible to all other accounts with which it has a connection, regardless of account type.

The network visibility module 206 may regulate whether an account can be seen to exist and/or how much of an account, for example details entered within a profile of an account, is visible. In one embodiment, an account may be able to see all public details entered in relation to another account. In one embodiment, an account may only be able to see that another account exists and/or a name of the account. In one embodiment, an account may not be allowed to see that another account exists at all.

The visibility of a first account to a second account may depend on one or more of a variety of factors. In one embodiment, the visibility may depend on one or both of the account type of the first account and the account type of the second account. In one embodiment, the visibility may depend on whether or not there is a connection between the first account and the second account.

In one embodiment, each account includes a number of permissions that define what that specific account can see and/or do within the social network. In one embodiment, the permission may be embodied by the type of account and how the type of account is regulated by one or more modules. In one embodiment, the permission may be embodied in connections between accounts. The permissions for each account may be stored within the account or may be calculated each time the account attempts to view another account or do something. For example, one or more modules that regulate activities or visibility on the social network may regulate the actions of an account. In one embodiment, the network visibility module 206 and the network connection module 204 may define the permissions of the accounts based on one or more of the account type and connections between accounts.

Figure 3:
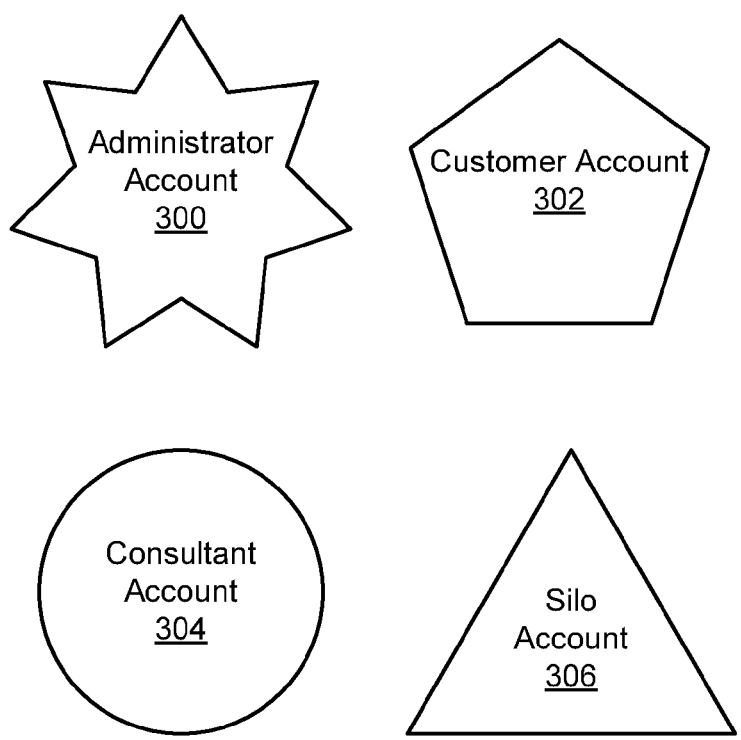
FIG. 3 is a schematic block diagram illustrating possible account types in accordance with one embodiment of the present invention.

Exemplary operation and features of the network module 102 will now be discussed in relation to FIGS. 3-6. FIG. 3 is a schematic diagram illustrating exemplary account types 300-306 provided and/or managed by the account type module 202 in a social network designed to connect those needing consulting services to those providing consulting services. The exemplary account types depicted include an administrator account 300 type, a consultant customer account 302 type, a consultant account 304 type, and a silo account 306 type. The shapes of the exemplary account types 300-306 are for illustrating that the account types may have different attributes and/or permissions and may help lead to simplicity and ease in understanding FIGS. 4-6.

It is important to note that the account types depicted are only exemplary. Accounts of different types may be added or replace the account types discussed in FIGS. 3-6. For example, an additional supplier account type may exist in some embodiments. Other types of accounts may also be enabled and created in other embodiments.

An administrator account 300 may be created for the owner or provider of a social network. In one embodiment, the administrator account 300 may include almost an unlimited level of permission. As such, the administrator account 300 may provide almost unlimited access to view other accounts and any data stored therein. In one embodiment, no other account, including an administrator account, is allowed to see password information and/or data marked as private. According to one embodiment, there is only a single administrator account 300 that is accessible to the owner or provider of the social network. Other embodiments may allow multiple administrator accounts 300. According to one embodiment, the administrator account 300 may be invisible to all other accounts regardless of account type.

A customer account 302 type may be created for use by individuals or entities that need consulting services. According to one embodiment, a customer account 302 is allowed to see all other customer accounts 302 as well as consultant accounts 304. According to another embodiment, a customer account 302 is allowed to see all other account types except an administrator account 300. The customer account 302 may also be visible to other accounts of the same type but not to consulting accounts 304, according to one embodiment. A customer account 302 may be provided with features that assist a user to locate a consultant that is providing needed services. For example, the customer account 302 may be provided with the ability to search the profiles of consultant account 304 accounts for individuals having the proper qualifications and attributes. Additionally, a customer account 302 may be able to form connections with other accounts.

A consultant account 304 may be created for use by individuals or entities that provide consulting services. According to one embodiment, only consultant accounts 304 are visible to an account of the consultant account 304 type. A consultant account 304 may be provided with features that assist an individual or entity in being located by a customer needing the individual's or entity's services. For example, the consultant account 304 may be provided with a profile where information regarding the services and attributes of the individual or entity may be entered, and this information may be made searchable. Additionally, a consultant account 304 may be able to form connections with other accounts.

In one embodiment, a consultant account 304 includes a very limited level of permissions and may have the lowest level of permission of any account 300-306 on a social network. In one embodiment, the consultant account 304 may include the most extensive profile of any of the accounts 300-306 on the network.

In one embodiment, the tiered nature of a social network including the different types of accounts 300-306 may facilitate the finding of a consultant to offer services. For example, the consultant account 304 may be visible to all other accounts while it can only see other consultant accounts 304. This may enable those looking for a consultant to find a consultant that best matches specific needs. The consultants that correspond to the consultant accounts 304 may be motivated to keep updated profiles so that other accounts can locate them. On the other hand, if other accounts are invisible to the consultant accounts 304 the entities or individuals corresponding to the customer accounts 302 may be motivated to get on the social network without fear of receiving too many requests for employment from consultant accounts 304. The unequal level of permissions, or relationships, may enable consultant accounts 304 to receive more work targeted to their strengths.

A silo account 306 may provide yet another type of account on a tiered social network. The silo account 306 may be granted a very high level of permission to a selected cross-section of a social network. For example, the silo account 306 may receive administrator like permission to see other accounts on the network. In one embodiment, the limitations on a silo account include only a limit on the accounts over whom the silo account 306 has such extensive permissions.

In one embodiment, the silo account 306 is given extensive permissions over a silo or group, defined by a specific detail or property. For example, a silo account 306 may be granted administrator like access to all consultant accounts 304 that list a specific company as their current employer. For example, a consulting firm may be granted a silo account 306 that includes administrator like access to consultant accounts 304 of all employees of the consulting firm. In one embodiment, an entity may approach an owner of the social network and request a silo account 306 that provides access to all accounts having a specified property. The specified property may include current employees, past employees, consulting expertise, or any other property that may be found in an account. In one embodiment, the larger the group that has a specified property the larger a fee an owner of a social network may charge for creation of a silo account 306.

In one embodiment, a silo account 306 may be created for use by an individual or entity that employs or manages a plurality of other individuals or entities. For example, a silo account 306 may be provided to an organization that has a large number of its employees or members on a social network. According to one embodiment, the silo account 306 has privileges similar to the administrator account 300 but only with respect to accounts within a silo related to the silo account 306. For example, if a consulting firm employs one or more individual consultants, a silo account 306 may be created for the consulting firm and consultant accounts 304 may be placed in a silo connected to the silo account 306. The silo account 306 may then be able to view each of the contained consultant accounts 304 and any information entered into a profile. Some embodiments may include customer accounts 302, consultant accounts 304, silo accounts 306, or a combination of account types within a silo.

In one embodiment, an account that falls within a silo of a silo account 306 may receive a notification that it is subject to a silo. In one embodiment, one or more symbols may be displayed when a user is accessing an account to notify the user that the account details are visible to one or more silo accounts.

In one embodiment, some details within an account or details entered and/or stored within an account may not be visible to silo accounts. For example, job applications by a consultant account 304 may not be visible to a silo account 306. This may allow users of consultant accounts 304 to continue networking and looking for work without possible negative repercussions from an owner of a silo account.

As used herein the term silo is given to mean a grouping of users or grouping of accounts. According to one embodiment, the grouping of user's in a silo is based on membership in an organization such as a company, partnership, corporation, or other legally recognized entity. For example, a silo account 306 owned by a corporation may correspond to a silo that contains one or more employees or shareholders. In other embodiments, the grouping of user's in a silo may be based on any factor such as type of work or any arbitrary factor.

A silo account 306 may or may not be visible to other accounts or may only be visible to certain account types. According to one embodiment, a silo account 306 is visible to other accounts as a customer account 302 type and/or a consultant account 304. Thus, other accounts may interact with a silo account 306 as if it were one of a customer account 302, a consultant account 304, or both. For example, a customer account 302 needing services may be led to a silo account 306 if it meets the needed requirements and/or attributes.

In one embodiment, a silo account 306 may include all the total attributes of its member accounts. For example, if a silo account 306 provides access to a silo including all employees of a company, the silo account 306 may be reflected as having all the work experience within the accounts of the employees. In one embodiment, a user of the social network (such as a user of a customer account 302) may be able to search for a consultant having a specified work experience or skill set. The results of the search may return individual consultant accounts 304 as well as silo accounts 306.

In one embodiment, a silo account 306 or access equivalent to access provided to a silo account may be granted to another type of account. For example, silo account access may be granted to a consultant account 304 and/or a customer account 302. In one embodiment, various limitations on an account may still exist. For example, if silo account 306 access is incorporated into a consultant account 304, the consultant account may still be unable to see unconnected customer accounts 302.

Figure 4:
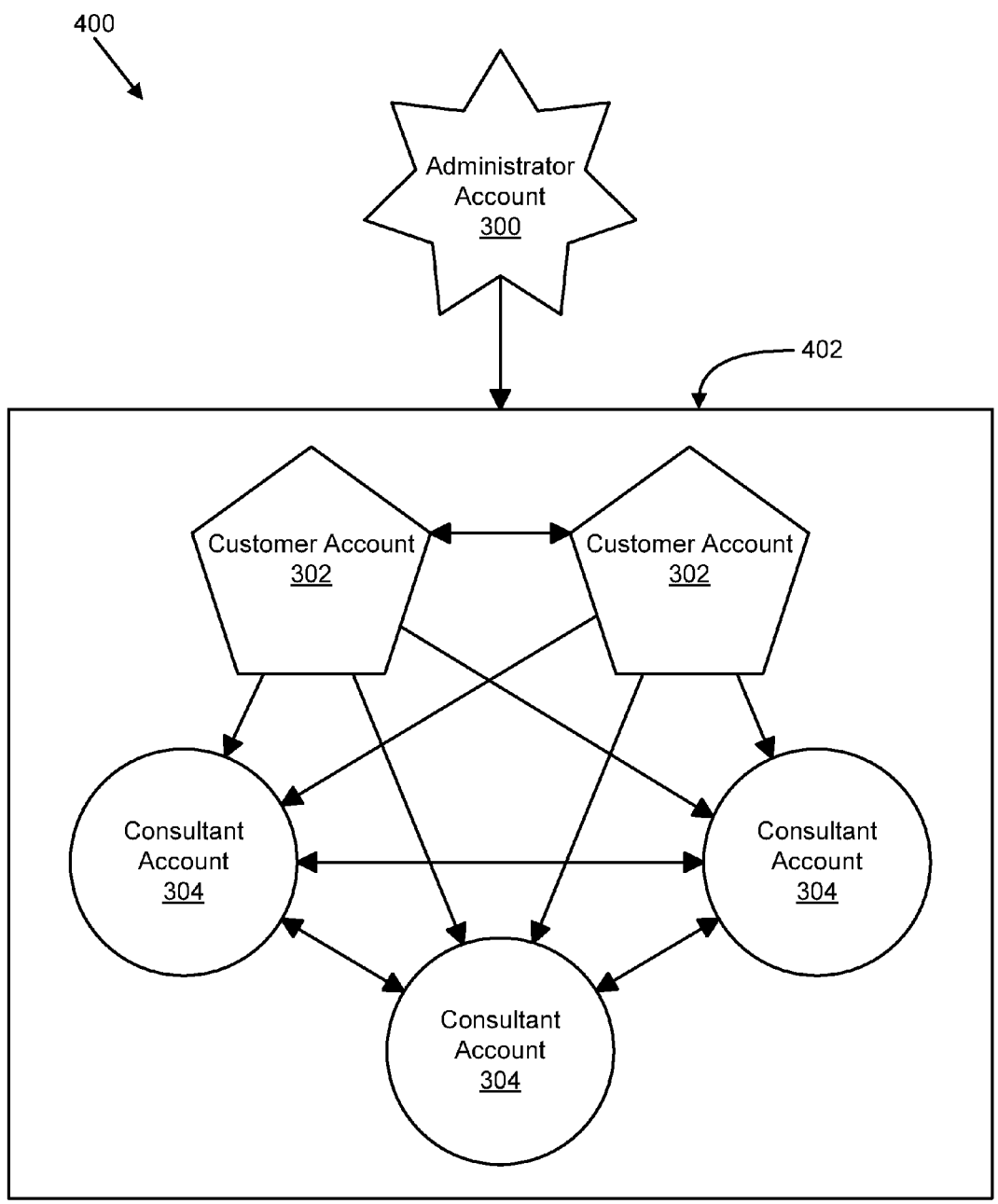
FIG. 4 is a schematic block diagram illustrating the visibility of account types on a social network in accordance with one embodiment of the present invention.

Turning now to FIG. 4 a schematic diagram 400 illustrating exemplary visibility between the accounts types 300-304 is shown. Arrows on a plurality of lines are shown to illustrate what type of account can see another type of account. Specifically, the line between the customer accounts 302 includes arrows pointing both ways. This indicates that customer accounts 302 are visible to other customer accounts 302. Similarly, the lines between the consultant accounts 304 include arrows pointing both ways. However, the lines between the customer accounts 302 and the consultant accounts 304 only include arrows pointing in the direction of the consultant accounts 304. This indicates that the customer accounts 302 can see unconnected consultant accounts 304 but the consultant accounts 304 cannot see the unconnected customer accounts 302. With regard to the administrator account 300 the line with an arrow pointing towards box 402 indicates that the administrator can see all accounts within the box but the accounts (customer accounts 302 and consultant accounts 304) cannot see the administrator account 300.

In the depicted embodiment, the customer accounts 302 are visible to other customer accounts 302. However, in another embodiment, customer accounts 302 are not visible to other unconnected customer accounts 302.

The lines and arrows may also indicate how communications or connections between different account types may be initiated, according to one embodiment. For example, a customer account 302 may be able to send a message to a consultant account 304 which may then be able to reply to that message. In another example, a customer account 302 may be able to request the formation of a connection to a consultant account 304. After a connection is formed, the consultant account 304 may be able to see and/or initiate communication with the customer account 302.

It is important to note that although FIG. 4 illustrates exemplary visibility between administrator accounts 300, customer accounts 302, and consultant accounts 304, the account types are exemplary only. Any type of account may be substituted for one or more of the accounts 300-304 in varying embodiments.

Figure 5:
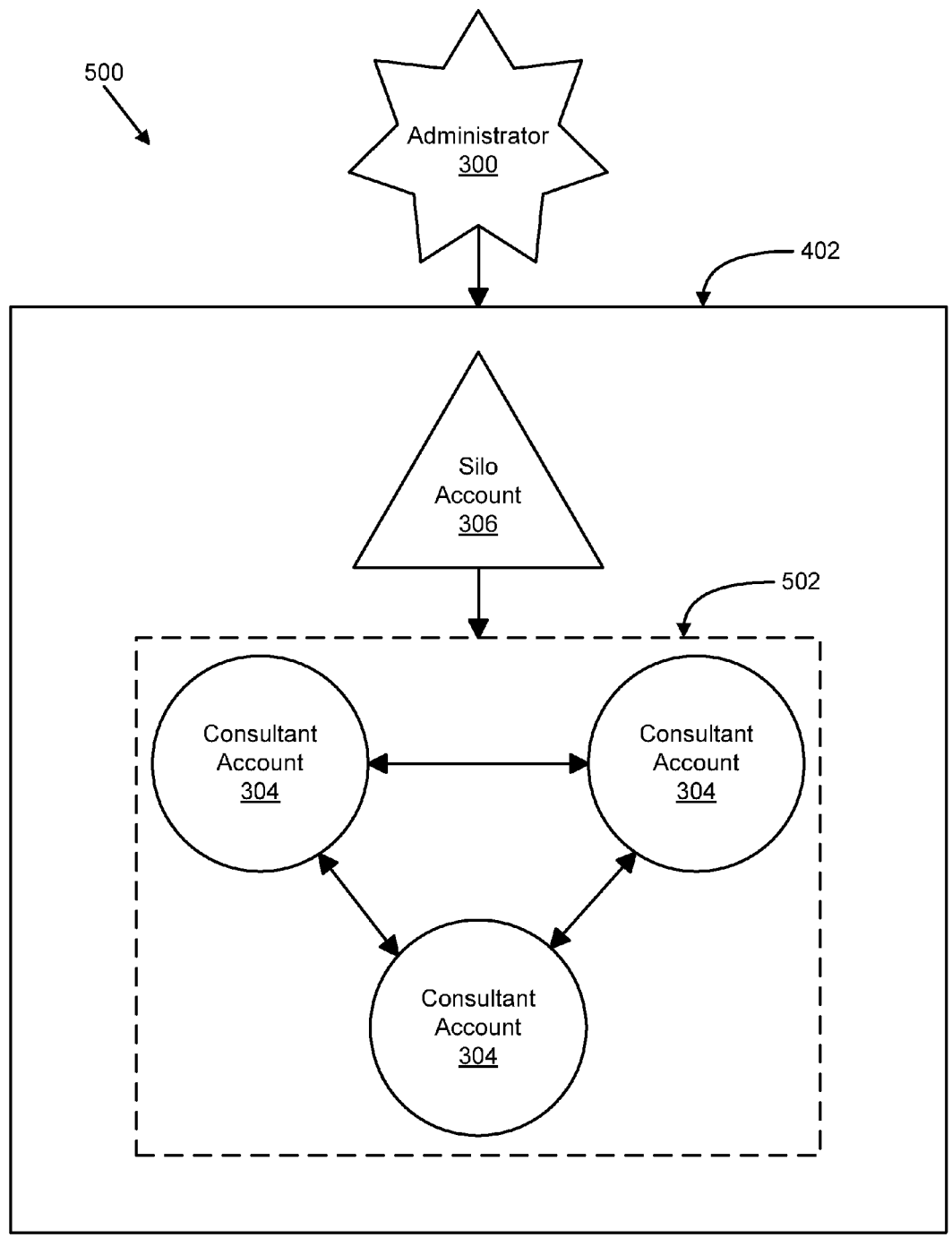
FIG. 5 is a schematic block diagram illustrating the relation of a silo account to other account types on a social network in accordance with one embodiment the present invention.

FIG. 5 is a schematic diagram 500 illustrating a silo account 306 and a silo 502 containing a number of consultant accounts 304. The silo account 306 is able to see all the consultant accounts 304 in the silo 502. According to one embodiment, the silo account 306 is able to see all details or almost all details stored in the profiles of the accounts in the silo 502. According to some embodiments, a silo 502 may contain other silo accounts 306 and silos 502. This may be useful to reflect the structure of an organization such as the departments within a corporation. In one embodiment, a symbol or notification may be displayed within the consultant accounts 304 within the silo 502 to notify users that they are visible to the silo account 306.

The silo 502 may allow a social network to be used as a workflow and networking tool internal to a company as well as external to a company. Many corporations spend large amount of money on developing software, creating and managing workflow methods, and/or providing infrastructure to keep employees busy and or finding the best individual for particular tasks. The silo 502 and associated silo account 306 may allow such a company or organization to utilize the structure, software, and resources of a social network to manage internal activities. This may bring down costs significantly and/or enable companies to better manage workflow.

Figure 6A:
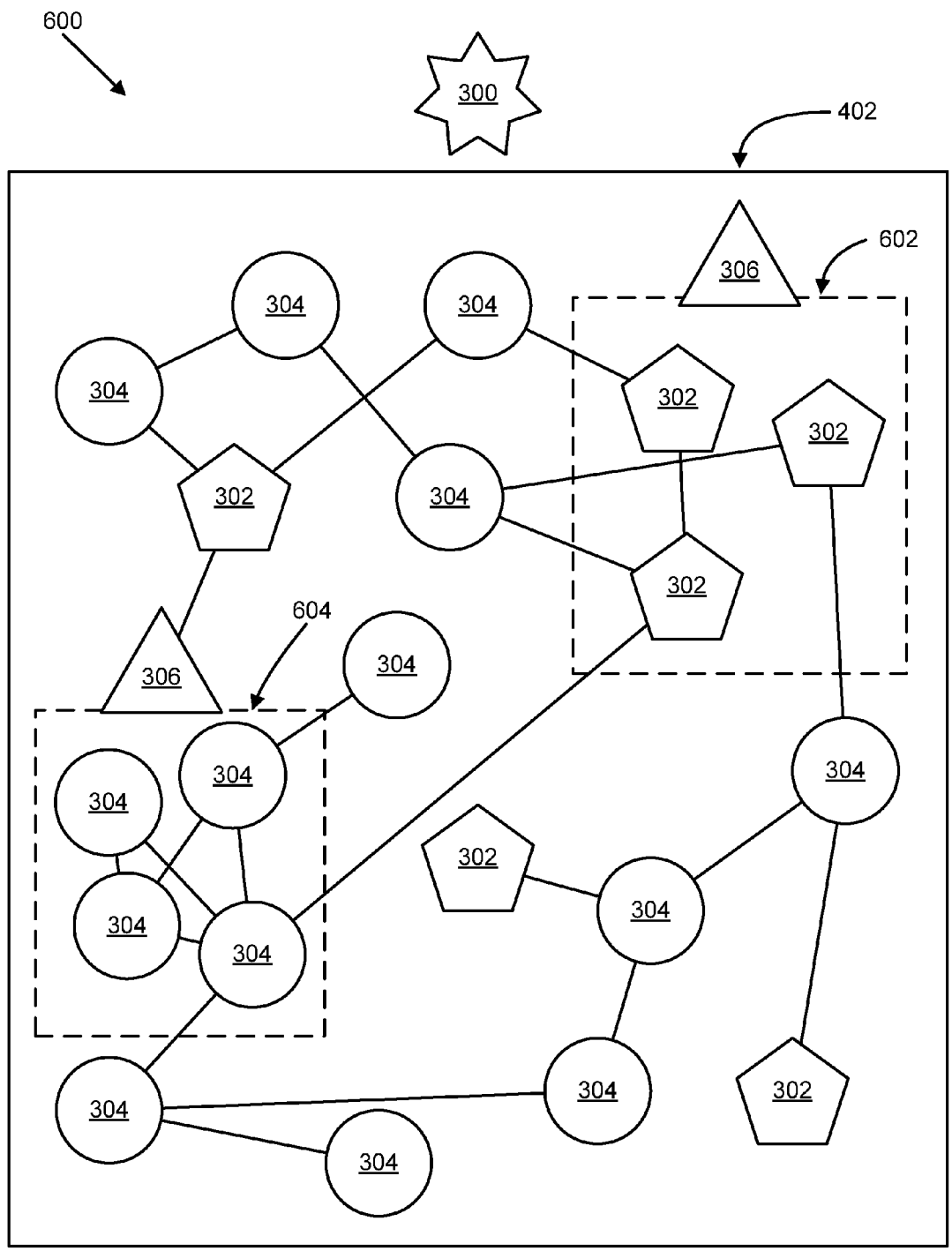
FIG. 6A is a schematic block diagram illustrating exemplary connections between account types on a social network in accordance with one embodiment the present invention.

Turning now to FIG. 6A a schematic diagram illustrating an exemplary social network 600 and connections that have been formed between accounts is shown. The social network, except for the administrator account 300, is contained within box 402. Within the box 402 is a plurality of accounts 302, 304, 306, and silos 602, 604 and connections between the accounts (indicated by lines between the accounts).

A connection between accounts may indicate that the accounts 302, 304 or the individuals or entities corresponding to the accounts 302, 304 have had some interaction. For example, perhaps an individual corresponding to a consultant account 304 has provided consulting services for an entity corresponding to a customer account 302. It is important to understand that the connections indicated in FIG. 6 are different from the visibility lines shown in FIGS. 4 and 5. For example, in the social network 600 a customer account 302 may be able to see all other customer accounts 302 and consultant accounts 304 but only have connections to a handful of other accounts.

According to one embodiment, an account is able to see all other accounts with which it has a connection, regardless of account type. For example, if a consultant account 304 has a connection to a customer account 302, the consultant account 304 may be able to see the connected customer account 302. This may be the case even though customer accounts 302 are generally not visible to consultant accounts 304. In one embodiment, an account may be able to see most or all details of a profile of a connected account.

In one embodiment, the administrator account 300 is able to see all the accounts 302, 304 306, silos 602, 604 and connections between the accounts (indicated by lines between the accounts). The administrator 300 may also be able to see details stored in the profiles of the accounts 302, 304, 306 within box 402. According to one embodiment, the social network 600 also allows a user of an account 302, 304, 306 who has not been able to locate another customer or consulting provider to submit a request for assistance. In one embodiment, this request for assistance may be provided to the administrator account 300 which may then search the social network 600. Due to the greater access of the administrator account 300 it may be possible to locate a needed customer or consulting provider. Thus, the administrator account 300 may allow the owner or provider of the social network 600 to act as a middle-man in connecting potential customers with service providers. In one embodiment, a request for assistance is sent to a silo account which can then look to other accounts within a silo corresponding to the silo account to locate a needed customer or consulting provider.

Also shown in the social network 600 are two silo accounts 306 each associated with a silo 602, 604. The silo accounts 306, in one embodiment, may have rights similar to the administrator 300 in relation to the accounts within the silos 602, 604. For example, the silo account 306 connected to the silo 604 may be able to see all or almost all details stored in the accounts 304 within the silo 604. The silo account 306 may then be used to locate individuals that would be best for certain projects. In one embodiment, the silo 604 may correspond to an engineering firm and the consultant accounts 304 correspond to engineers within the engineering firm. The silo account 306 may then be used by the engineering firm to locate one or more engineers for a project based on what is in the user profiles of their corresponding consultant accounts 304. In this manner, the social network becomes not only a job seeking and networking tool external to companies but also a workflow tool internal to companies.

As previously mentioned the silo accounts 306 may or may not be visible to other accounts 302, 304 in various embodiments. In some embodiments, the silo accounts 306 may appear to other accounts as a consultant account 304 or a customer account 302 based on the type of accounts contained in its corresponding silo 602, 604. For example, the silo account 306 connected to the silo 602 may appear to be a customer account 302 to other accounts and the silo account 306 connected to the silo 604 may appear to be a consultant account 304 to other accounts. In one embodiment, a silo may contain both customer accounts 302 and consultant accounts 304 and a corresponding silo account 306 may appear to have both consulting and customer properties to other accounts.

The social network 600 illustrates one embodiment of a multi-tiered social network. The different types of accounts 300-306 as well as the silos 602, 604 provide a significant level of functionality. The limited visibility of the customer accounts 302 to the consultant accounts 304 may allow for more efficient use of the social network 600. For example, users of customer accounts 302 may not want repeated solicitations for work. The ability for the customer accounts 302 to see consultant accounts 304 may allow them to search and locate the best consultant for their particular needs. With regard to the consultant accounts 304 being visible to all the customer accounts 302 may be quite desirable. Numerous customers may have the ability to easily search for and locate a consultant. Thus, a consultant may be able to concentrate more fully on providing consulting services rather than advertising and seeking for additional consulting work.

Figure 6B:
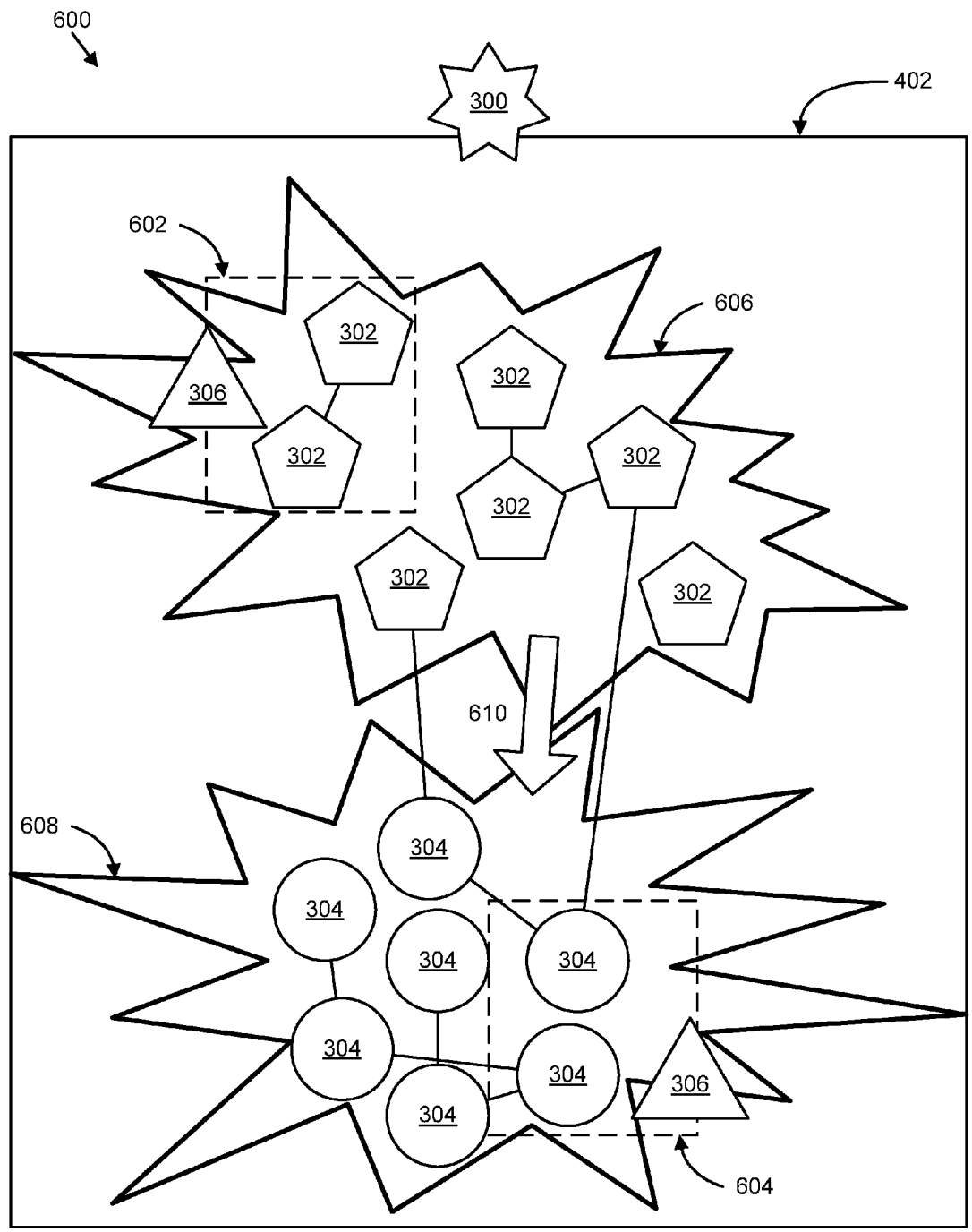
FIG. 6B is a schematic block diagram illustrating exemplary connections between social networks and account types on a social network in accordance with one embodiment the present invention.

Turning to FIG. 6B an exemplary configuration of a social network 600 that includes a first social network 606 and a second social network 608. The social network 600 is similar to the social network 600 of FIG. 6A in that it includes a number of accounts 300, 302, 304, 306, and silos 602, 604 as well as relationships (represented as lines) between accounts. Thus, any of the teachings and variations discussed in relation to FIG. 6A may also be applicable in the social network 600 of FIG. 6B.

In addition to the similarities with FIG. 6A, FIG. 6B also illustrates a number of differences. For example, the accounts 302, 304, and 306 are separated into two different sub-networks, a first social network 606 and second social network 608. According to one embodiment, the sub-networks 606, 608 may operate as fully functional social networks. In one embodiment, the sub-networks 606, 608 may be networks that previously operated independently, and have been combined through functional relations between the networks. In one embodiment, accounts within the same network may be equal in relation to permission while the accounts in different networks 606, 608 may be unequal. Arrow 610 illustrates exemplary inequality between the networks 606, 608. According to one embodiment, the accounts of the first network 606 may have greater permissions with regard to the accounts of the second network 608 than the accounts of the second network 608 have in relation to the accounts of the first network 606.

According to the depicted embodiment, the first network 606 is a social network for customers, or customer accounts 302 while the second network 608 is a social network for consultants, or consultant accounts 304. The customer accounts 302 and consultant accounts 304 may have the same or similar functionality as discussed in relation to previous figures.

The embodiments of FIGS. 6A and 6B reflect exemplary structures and construction of social networks in accordance with the present invention. In one embodiment, the sub-networks 606, 608 may reflect a data structure of the social network 600. According to one embodiment, all of the accounts 300-306 of the social network 600 may be stored within a single database. In another embodiment, two or more databases may store the accounts 300-306. In one embodiment, the accounts 302, 306 of the first network 606 are stored and managed by a first database and the accounts 304, 306 of the second network 608 are stored and managed by a second database.

In one embodiment, the permission between accounts of different types (such as permission between accounts 302 and 304) may be defined by permissions between the first network 606 and the second network 608 as indicated by arrow 610. In one embodiment, the permissions between accounts may be defined in relation to the accounts themselves and not the sub-networks. One of skill in the art in light of the present disclosure will recognize that the varying of permissions between may be accomplished in a variety of manners though any combination of account types, sub-networks, databases, and permission.

Additional advantages will also be discussed and/or become apparent in relation to further discussion and the remaining figures.

Figure 7:
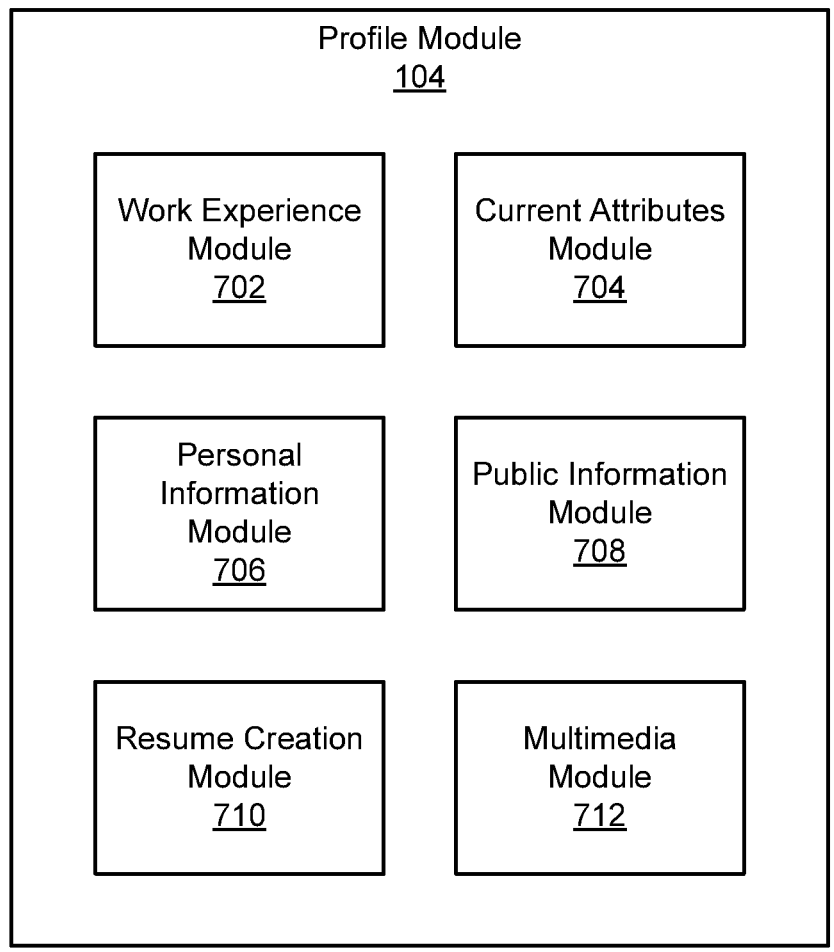
FIG. 7 is a schematic block diagram illustrating one embodiment of a profile module in accordance with the present invention.

FIG. 7 is a schematic block diagram depicting an exemplary profile module 104 according to one embodiment. The profile module includes a work experience module 702, a current attributes module 704, a personal information module 706, a public information module 708, a resume creation module 710, and a multimedia module 712. The profile module 104 and its functionality are contemplated for use within any social network, including the social network discussed above in relation to FIGS. 3-6B. In fact, reference to tiered social networks will be made but equivalent or similar functionality may be present in embodiments on non-tiered social networks. The profile module 104 provides and manages a profile for an account, such as accounts 300-306, which can be filled in and/or modified by a corresponding user. The profile module 104 may require a user to provide at least certain details for a profile before a corresponding account becomes visible to others and/or before the account becomes functional for networking purposes. In one embodiment, a minimum amount or level of information may be required before a corresponding user profile or account may be used to apply for a job posted on a job board.

According to one embodiment, the details or information that may be entered into a profile may vary with the account type. For example, in a multi-tiered network that includes two or more account types, the user information that may be entered may vary based on the account type. In one embodiment, the consultant account 304 of FIGS. 3-6B may include a profile that is configured to receive details desirable for a consultant account. For example, the profile may be configured to show work experience, availability, and or other information that may be useful to a consultant or to those searching for a consultant. In one embodiment, the customer accounts 302 of FIG. 3-6b may include a profile that is configured to receive details desirable for a customer account. For example, the customer account 302 profile may be very limited and only include general information such as the name of a corresponding customer, such as an individual or entity. In one embodiment, a social network may include only one user account type and all accounts may be equal in what details or information may be entered and/or stored in the profile of a user account.

The work experience module 702 collects and/or stores work experience data in a profile. The work experience data stored in the profile may include the work experience of a user, team, firm, or company, depending on the account to which the profile corresponds. For example, if a user account corresponds to a single individual, the work experience data stored in the profile may include the work experience of only that single individual. If a user account corresponds to a team, firm, or company, the profile may include the work experience of the team, firm, or company as a whole and may include the work experience of each of the individuals that make up the team firm, or company.

According to one embodiment, the work experience module 702 collects and displays work experience data in a stratified manner. In one embodiment, the work experience may be collected, stored, and/or displayed as a table, matrix, or other data structure that has a number of rows and columns. In one embodiment, a matrix may include one or more rows that each corresponds to an abstracted level of work experience. For example, a two or more rows may correspond to work experience at a first abstracted level while two or more additional row may correspond to work experience at a second abstracted but more specific level. In one embodiment, a matrix may include one or more columns that include specific details about a user's, team's, company's, or firm's work experience. In one embodiment, a row may include a description or category of work experience while another row may include a time period or length of time corresponding to that description or category.

According to one embodiment, collecting work experience data in a stratified manner involves collecting information about work experience at two or more abstracted layers. For example, the work experience module 702 may allow a user to enter work experience details corresponding to a high level of abstraction regarding work experience and also allow a user to enter work experience details corresponding to a more specific level regarding work experience.

For example, a first abstracted layer may correspond to a type of industry served. A user may be prompted to select the types of industries the user has served and then provide the total number of years worked serving those industries. A second abstracted layer may correspond to a category of service. A third abstracted layer may to specific consulting services offered.

Often, work experience is listed in a chronological view. However, a chronological view of work experience often fails to communicate a job candidate's skills or experiences in a specific area. Often, employers are looking for an individual with a certain amount of experience in a specific industry or category. Displaying work experience by employment position and/or chronologically generally fails to convey this information. Additionally, even if this information is decipherable it often requires extra time by a reviewer. Reviewers may not desire to take any extra effort to determine whether certain job requirements are met and may thus disregard a job application if it is not explicitly clear that the applicant qualifies or has desirable credentials or experience.

In one embodiment, by presenting job experience in a stratified manner an employer and/or job reviewer can quickly ascertain what the individuals expertise is and how well it corresponds to a project or employment position. In other words, that data is presented in the same manner that employers generally think when searching for job candidates. Additionally, gathering, storing, and/or displaying work experience in a stratified manner enhances how well work experience can be searched. This can have significant positive impact on the ability to find the right consultant in a large social network. Job reviewers may further be able to easily identify work experience, credentials, or qualifications that the potential employer did not explicitly put in a job posting but still finds desirable. By presenting work experience information in a stratified manner, a potential employer may be able to more easily determine the best match for a job and an applicant may be able to more easily demonstrate his or her qualifications and abilities.

In one embodiment, work experience may be collected and/or stored in a variety of manners in addition to or instead of the stratified manner explained above. For example, a resume, curriculum vitae (CV), cover letter, professional introduction, or any other conventional form of displaying/organizing work experience may be used. In one embodiment, a file may be uploaded to a user profile that includes information about work experience. For example, a resume, CV, cover letter, professional introduction, or any other file may be uploaded to a profile.

According to one embodiment, the access to the features or information provided or stored by the profile module 104 may depend upon permissions of an account. According to one embodiment, accounts of a first type may not be allowed to access one or more portions of a profile unless they are connected to an account that corresponds to the profile. In one embodiment, an administrator type account, a silo type account, or other type of account may be granted access to portions of a profile that are not accessible to other accounts. In one embodiment, a job poster who posted a job position to which an individual, team, company, or firm applied may be able to see the work experience of a profile that corresponds to the individual, team, company, or firm. In one embodiment, the type of connection, such as job poster, friend, administrator, silo account, or other type of account may be restricted in what information on a profile it can accessed based on the connection type.

FIGS. 8 and 9 depict exemplary entry and display of work experience provided by the work experience module 702. FIG. 8 shows an exemplary portion of a webpage 800 allowing for stratified entry of professional experience. The webpage 800 allows for three abstracted layers. Other embodiments may include fewer or additional abstracted layers. In the depicted first layer 802 a user can enter information regarding the industries the user has served. In the second depicted layer 804 a user can enter information regarding the category of services provided. In one embodiment, the category of services may include one or more functional areas within an industry, such as an industry selected or entered in the first layer 802. In the third layer 806 a user can enter information corresponding to the consulting services offered.

According to the depicted embodiment, each of the layers 802-806 includes a plurality of columns that include fields where information may be selected or entered regarding that layer. According to the depicted webpage 800 the user can enter a description, the years of experience, the consulting type, and the career level served in corresponding columns. Other fields may also be available in various embodiments. According to one embodiment, the webpage 800 allows entry using drop down list boxes, and/or simple text entry. According to one embodiment, after data has been entered on the webpage 800 the data is stored in a data store for later access.

According to one embodiment, the first layer 802 includes a drop down box that includes a variety of industries. According to one embodiment, exemplary industries listed in the drop box may include, but are not limited to one or more of the following: Accounting—Audit Services; Advertising—Marketing/Public Relations; Aerospace—Defense; Agriculture; Architectural and Design Services; Art—Photography; Automotive; Aviation—Airline; Banking—Financial Services; Biotechnology; Business Services; Chemical; Computer—Hardware/Software/Services; Construction; Consumer Products; Education—Academics; Electronics—Semiconductors; Employment—Recruiting/Staffing; Energy—Utilities/Fuel; Engineering Services; Entertainment; Environmental—Green Services; Exercise and Fitness; Fashion—Apparel; Film—Performing Arts; Food and Beverage; Funeral—Cemetary; Government—Civil Services; Government—Military Services; Healthcare; Hospitality; Import—Export; Industrial; Insurance; Internet Services; Law Enforcement; Legal Services; Library Science; Management; Consulting Services; Manufacturing; Media—Broadcasting/Journalism; Merchandising; Metals and Minerals; Music; Nonprofit/Charitable Organization; Office Supplies—Equipment; Personal and Household Services; Pharmaceuticals; Real Estate—Sales/Lease/Management; Rental Services; Restaurant—Food Services; Retail; Security and Surveillance; Social Services; Sports and Physical Recreation; Staffing and Employment; Telecommunications—Wireless Services; Training; Transport and Storage; Transportation; Travel—Tourism; Waste Management; Wholesale.

According to one embodiment, the second layer 804 includes a drop down box that includes a variety of service categories, or functional areas within an industry. According to one embodiment, exemplary categories or functional areas listed in the drop box may include, but are not limited to, one or more of the following: Accounting; Administrative—Clerical; Business/Strategic Management; Customer Support; Education—Training; Engineering—Science/R&D; Executive Management; Finance; Food Services—Hospitality; Human Resources; IT Services—Systems Administration; Legal; Logistics; Maintenance; Marketing—Advertising/Sales; Operations—Manufacturing/Production; Procurement/Contract Administration; Product Development; Program/Project Management; Quality Assurance; Real Estate; Safety; Security—Loss Prevention. As will be understood by one of skill in the art in light of the present disclosure, the above lists are exemplary only. Additional or alternate industries, categories, or functional areas may be listed in some embodiments.

Although the categories and functionally described above is provide in relation to consulting work experience, one of skill in the art will recognize categories and functions for other fields for work experience. For example, specific categories or layouts may be designed for engineers, human resource managers, executives, legal service providers, or any other profession or fields of work.

FIG. 9 depicts an exemplary stratified view of work experience in a professional experience matrix 900. According to one embodiment, the work experience module 702 pulls data from a data store to create the professional experience matrix 900. The professional experience matrix 900 includes a first level of abstraction 902, a second level of abstraction 904, and a third level of abstraction 906.

Returning to FIG. 7 the current attributes module 704 allows a user to enter data corresponding to attributes of the user to be available for others to see. The current attributes module 704 collects answers to a variety of questions which may be quite useful to employers and job seekers. The answers to the questions may be made publicly available on the user's profile, such on a dashboard page of the profile, where customers can view the answers to determine whether the consulting individual or entity meets the customer's requirements.

The questions asked can vary greatly. According to one embodiment the questions asked are directed towards location, availability, travel considerations, and/or consulting types, preferred team size. These may often be questions that require a proper answer before employment is even considered. This may be very helpful since employers may spend considerable time finding an individual that meets their needs only to find that the individual refuses to go to a certain location or is not currently available.

FIGS. 10 and 11 depict exemplary pages 1000 and 1100 illustrating exemplary dashboard attribute questions and entry. FIG. 10 shows a webpage 1000 illustrating exemplary layout and questions to be answered by an individual consultant. As will be clear to one of skill in the art, additional or alternate questions may be used for potential employers or job searchers in fields of work or professions other than consulting.

A location section 1002 collections information about the individual's work location. An availability section 1004 collects information about the individual's availability to work. A travel considerations section 1006 collections information about the individuals traveling ability and desires. A consulting type section 1008 collects information about the type of consulting an individual generally performs and prefers not to perform. A teaming section 1010 collects information regarding the individual's teaming desires and abilities.

FIG. 11 shows a webpage 1100 illustrating exemplary layout and questions to be answered by a consulting firm or entity. A location section 1102 collections information about the firm's work location. An availability section 1104 collects information about the firm's availability to work. A travel considerations section 1106 collections information about the firm's traveling ability and desires. A consulting type section 1108 collects information about the type of consulting a firm generally performs and prefers not to perform. A teaming section 1110 collects information regarding the firm's teaming desires and abilities.

As will be understood by one of skill in the art in light of the present disclosure, the above sections 1002-1010 and 1102-1110 and the included questions are exemplary only. Fewer, additional, or alternate questions may be provided in other embodiments. According to one embodiment, an additional credibility section may also be included which may allow a user to request a third party to review and verify the accuracy of at least a portion of information entered in the user's profile. According to one embodiment, the third party would review one or more of the work experience of the user, the dashboard attributes of the user, a detailed resume, or other type of information provided in the profile.

A reviewer may review the details of the profile in a variety of manners. According to one embodiment, a reviewer may do a background check on the individual by contacting references, previous employers, or even performing a criminal background check. The reviewer may meet an individual or officer of an entity to verify identity, resources, and the like. This may provide trust for customers and potential clients to know that a third party has investigated a service provider and or consultant. Credibility or verification procedures may be performed in manners discussed in relation to the credibility module 1206 of FIG. 12, in one embodiment.

Returning once gain to FIG. 7, the personal information module 706 may allow a user to enter, update, and store personal information in the account profile. According to one embodiment, the personal information module 706 maintains this personal information in confidentiality and does not allow it to be seen by other accounts. According to one embodiment, this information is not even available for viewing by the administrator account 300. In addition to entered personal information, the personal information module 706 may store communications, such as emails or other communications sent within a social network, as confidential. An account's connections may also be kept confidential.

The public information module 708 may allow a user to enter or update information that the user desire to be seen by others. This may include a professional introduction, a short history about the user or entity, or even the ability to enter and provide "tweets", status messages, or other electronic postings or communications known in the art. According to one embodiment, the public information module 708 allows this information to be seen by any account. According to another embodiment, this information may only be seen by accounts to which the profile is visible. According to another embodiment, this information may be viewable on the internet even to those not having an account on the social network.

The resume creation module 710 may create at least a portion of a resume from the information entered in a profile by a user. For example, the resume creation module 710 may collect and combine information obtained by the work experience module 702, the current attributes module 704, and/or other modules to provide create at least a portion of a resume. An exemplary resume assembled by the resume creation module 710 will be discussed in relation to FIG. 16.

The information in a profile provided by the profile module 104 may be made visible to other accounts based on a variety of factors. These factors may include one or more of preferences of the owner of the account, the type of account that is attempting to view a user's profile, the type of account on which the profile resides, whether the individual has applied for a job and who posted the job, and the section within the profile where information was entered. Other factors may also be used in controlling the visibility of information in a user profile.

The multimedia module 712 may collect and or store multimedia files or online links to files or web pages. In one embodiment, a user may upload any file to a profile, such as a text document, image, video, or any other file. The user may then be able to include these files in a job application or may be available for the public or accounts with connections to the user's account. In one embodiment, a user may enter or save links to online files or web pages. For example, a user may have a video or website that may be useful to illustrating the user's skill, expertise, or qualifications. For example, the user may have posted or created a video on a video sharing site which illustrates the user's knowledge of a particular subject or experience in a particular work environment. Exemplary media files that may be uploaded or linked to include, but are not limited to image files, sound files, web pages, videos, animations, or any other media file known in the art.

The uploading of multimedia files or providing of links to online files or web pages may be extremely helpful to both a job candidate and reviewer of job applications. Currently, it is not uncommon for a potential employer to do searches online for information corresponding for a job applicant. This may be to verify information represented by the job applicant or find information not mentioned by a job applicant. In some cases, this can be a time consuming process. Additionally, the reviewer may not find information that would be favorable to the job applicant.

By providing multimedia files and/or links to online information about an applicant, a job applicant can make this process much easier for a reviewer. Additionally the job applicant can make it more likely that the job poster or potential employer sees the good online information. Furthermore, the job applicant can show his or her personality and abilities in more concrete and interesting ways that may help catch a job reviewer's attention and convince him or her of the desirability of interviewing or hiring the job applicant.

Figure 12:
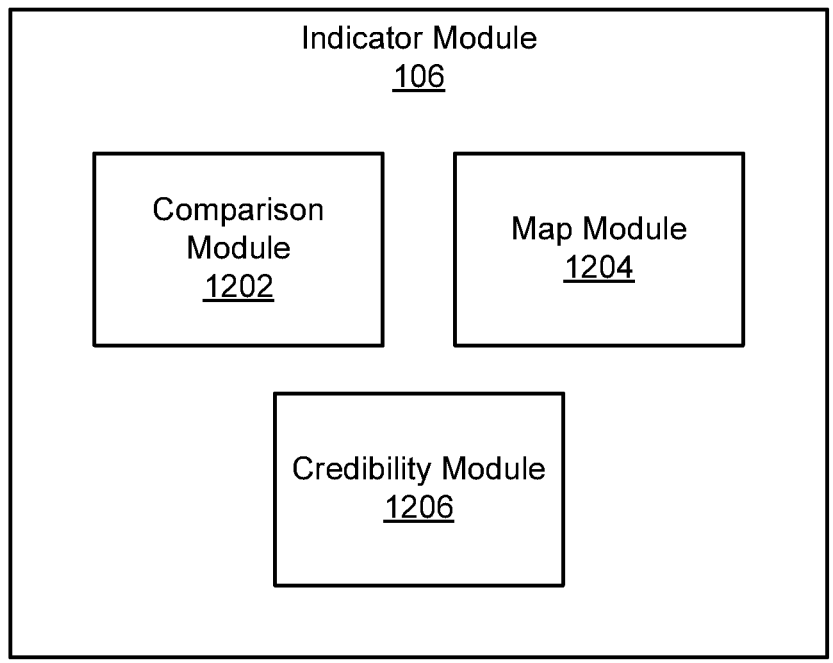
FIG. 12 is a schematic block diagram illustrating one embodiment of an indicator module in accordance with the present invention.

FIG. 12 depicts a schematic block diagram of an indicator module 106 according to one exemplary embodiment. The indicator module 106 provides indicators that reflect the degree of matching or similarity between two sets of data. The indicator module 106, as depicted, includes a comparison module 1202, a map module 1204, and a credibility module 1206.

The comparison module 1202 compares two sets of data and provides an indicator reflecting the degree of match. According to one embodiment, the comparison module 1202 receives two sets of availability data, such as availability requirements for a job or query and the dashboard attributes and/or work experience of a particular consultant. The comparison module 1202 then comparers the job requirement or query with the attributes of a consultant. Depending on the degree of match, different indicators may be provided. The indicators may include a number, a color, a word, a graph, a graphic, or some combination these. For example, an indicator reflecting a good match may be green while an indicator reflecting a bad match may be red. Some embodiments may include additional levels of indicators. For example, going along with the previous examples, a yellow indicator may reflect that the match is a fairly close match but not an exact match.

Instead of using colors, other indicators may include numbers, such as percents to indicate a match. Other indicators may include words such as good, bad, close, etc. Other indicators may include graphics such as circles, X's, smiles, frowns, etc. Yet other indicators may include a combination of the above.

The indicators provided by the comparison module 1202 may enable a job applicant or employer to quickly ascertain how good of a match a candidate is for a job. An employer or application reviewer may not need to dig through a job application to find the most important details or attributes of an applicant. Rather, the employer can quickly see that important qualifications or attributes are present or absent. If the qualifications or attributes are absent, the employer can quickly discard the application and move to the next one. If the qualifications are present, the employer can look more closely at the application and/or set up an interview or appointment to meet with the candidate.

The map module 1204 may display a map to illustrate the location of different work locations and/or traveling regions. The map module 1204 may be used in relation to location attributes or requirements as well as traveling attributes or requirements. For example, a job applicant may be able to look at a map to decide whether a job opportunity is within range of is traveling abilities. Alternately an employer can look at the map to see if a potential consultant would be available in a particular location or region.

The credibility module 1206 may provide an indicator showing whether a third party has verified information in the profile of an account. According to one embodiment, the credibility module 1206 may return a range of indicators depending on whether the account has been verified, whether a verification procedure revealed inaccuracies or problems, and/or whether no verification process has been undertaken.

The credibility module 1206 may be able to look up information resulting from a verification procedure and return a credibility indicator reflecting the verified credibility of the account.

According to one embodiment, a person's or entity's identity may be verified to determine the account user's level of credibility. In one embodiment, the level of credibility may be evaluated before the individual or entity is allowed to create an account. In one embodiment, an account may be created prior to verification but various features may be disabled until a person's or entity's identity is verified. In one embodiment, one or more details besides identity may be verified prior to account creation or enablement of features. For example, a background check, employment verification, employment history verification, or other details with regard to an individual or entity may be verified. The identity or details may be verified by an owner of a social network or by some other third party.

In one embodiment, having a third party perform an evaluation of an individual on the social network may allow for significant level of trust. For example, if an account simple endorsements from other accounts or individuals on the social network may not be as trustworthy because the credibility of the endorsing account may not be verifiable. Thus, you may have two unknowns endorsing each other with no real way of verifying that the individuals or entities are who they say they are. Third party verification by the owner of the social network or some other entity may help customers or those seeking goods or services to receive have trust that the details of a profile or job application are accurate.

Figure 13:
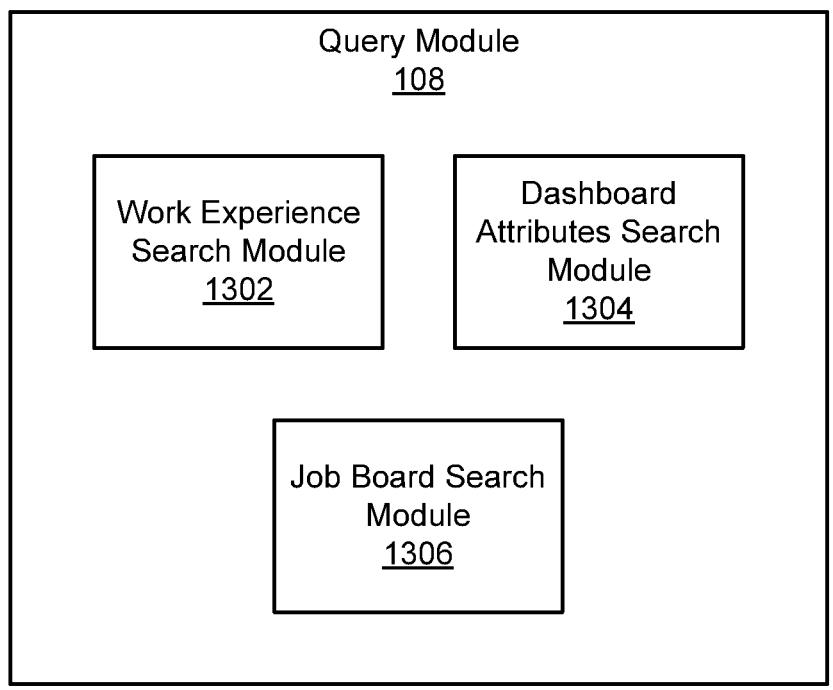
FIG. 13 is a schematic block diagram illustrating one embodiment of a query module in accordance with the present invention.

FIG. 13 depicts a schematic block diagram of a query module 108 according to one exemplary embodiment. The query module 108 may provide search features to accounts allowing them to locate other individuals, entities, or job postings. According to one embodiment, the search features available to different account types may vary. The query module 108, as depicted, includes a work experience search module 1302, a dashboard attributes search module 1304, and a job board search module 1306.

The work experience search module 1302 allows a user to perform a search for accounts having desired work experience. According to one embodiment, the work experience search module 1302 searches for entries in their professional experience matrices 900 on their profiles. This may allow a user to go searching for a firm or individual consultant that can meet its consulting needs rather than posting a job and receiving a large number of applicants to dig through.

Searches may be performed according to a variety of methods. According to one embodiment, a text search may be performed which searches for a provided text entry. This may be similar to web searches well known in the art. According to another embodiment, a variety of drop down boxes are provided that correspond to drop down boxes in a professional experience matrix entry form 800. Results may be returned that include accounts that selected the same item from a drop down box, or the same combination of items from drop down boxes.

Yet another method of searching may include the browsing of a professional experience tree. This may be enabled in part by the professional experience matrix 900. A user could browse a first abstracted layer to select, for example, a desired industry served. The user could then dig deeper by browsing and selecting a category from a second abstracted layer. The user could continue through the professional experience tree until the user has located the desired area and one or more profiles of corresponding accounts have been provided. According to varying embodiments, the professional experience tree may include a varying number of branches or levels with correspond to the abstracted levels and/or categories of a professional experience matrix. According to varying embodiments, this search may be performed with drop down and or multiple choice boxes, text searches, or browsing of a graphical tree structure.

According to one embodiment, using the work experience search module 1302 may be restricted. For example, in one embodiment only the administrator account 300 can perform work experience searches. In other embodiments, only certain account types can perform such searches. In another embodiment, silo accounts 306 may also be able to perform such searches, but only in respect to those accounts in a corresponding silo. In one embodiment, an additional account type granting access to search features of the work experience search module 1302 may exist. For example, an individual or entity may not desire to create an account of one of the existing account types but may simply wish to search the social network for individuals or entities that can provide specialized services. This individual may be able to perform the search and use this information to contact a specific individual or entity without going through the process of posting a job on a job board. According to another embodiment, work experience searches can be made available based on payment for time, payment per search, or payment per profile accessed. For example, an account may be allowed to search on a per-search fee basis, per-time fee basis, processor workload fee basis, or any other fee basis known in the art.

In one embodiment, a search may be blind. That is, a searcher may be able to use one or more search features and receive one or more matches, but may not be able to see the details regarding the matches. For example, a searcher may not be able to see the user name, or other information identifying the individual or entity behind the matched account. In one embodiment, a searcher may perform the search and pay a fee to contact one or more matches.

The dashboard attributes search module 1304 allows a search based on dashboard attributes, such as those discussed in relation to FIGS. 7, 10, and 11. Such searches may also be restricted in a manner similar to that described in relation to the work experience search module 1302. According to one embodiment, customer account 302 can perform searches based on dashboard attributes to locate a consultant account 304. According to one embodiment, an administrator account 300 can perform attribute searches for the whole social network 600. According to one embodiment, a silo account 306 may be allowed to perform attribute searches for accounts in a corresponding silo. In one embodiment, an additional account type granting access to search dashboard attributes may be created. Additionally, fee-based searches may also be available for purchase by one or more account types. In one embodiment, any account may be used to perform an attribute search of other accounts with whom the account has connections.

The job board search module 1306 may be used to search a job board for job postings that correspond to search requirements. For example, a consultant account 304 may be used to locate a job for the account user. As another example, a customer account 302 may be used to find competing job postings. Job boards will be covered with greater detail in relation to FIGS. 15-18.

Turning now to FIG. 14 an exemplary web page view of a dashboard attribute search page 1400 containing indicators 1407 is shown. The dashboard attribute search page 1400 includes a search requirements section 1402, a user attributes match section 1404, and a search results section 1406.

The search requirements section 1402 includes a variety of search requirements that can be selected, entered, or changed. The search requirements section includes search requirements that correspond to the dashboard attributes shown in FIGS. 10 and 11. For example, the search requirements section 1402 includes requirements for availability, location, type of consulting services, etc. A user performing a search may select the options that correspond to a desired candidate and the user attributes match section 1404 and search results section 1406 may change to reflect the selected or entered search requirements.

The user attributes match section 1404 includes indicators 1407 that reflect the degree of match between the user's attributes (the account performing the search) and the search requirements selected in the search requirements section 1402. In one embodiment, information from the profile of the searching user may be automatically pulled for creation and/or calculation of the indicators. According to one embodiment, the indicators 1407 correspond to one or more dashboard attributes provided by a user. For example, the questions in the sections 1002-1010 and 1102-1110 of FIGS. 10 and 11 may have indicators corresponding to the questions and/or sections. Additional indicators for other attributes and/or qualifications of a user may also be present.

According to one embodiment, the indicators 1407 are of a color that indicates the degree of match between the search requirements and the user's attributes. In the depicted embodiment, the indicators 1407 include information indicating the user's attributes. For example, the first indicator in the user attributes match section 1404 includes the word "Yes" indicating that the answer to the "Credibility" question was yes. According to other embodiments, the indicators do not include information indicating the user's attributes, but rather only show the degree of match.

The search results section 1406 includes a plurality of accounts and corresponding indicators 1407. According to one embodiment the search results are arranged with better matches at the top and poorer matches towards the bottom.

The dashboard attribute search page 1400 is exemplary only, as will be understood by one skilled in the art in light of the present disclosure. Additionally, similar principles and layouts discussed in relation to FIG. 14 may be applicable to work experience searches, job board searches, etc. Additionally, rather than searching for individual consultants the dashboard attribute search page 1400 may also be used to search for consulting firms.

The query and search abilities provided by the query module 108 may provide significant benefits to a social network. For example, the ability for a consultant to be found by such a search may provide motivation for users to keep account details, such as profile information, current and accurate. Having work after a current project may be vital to staying employed and earning sufficient money for the consultant. Thus, for example, the consultant will be very motivated to update when he or she is available so that the next project will not be missed. Additionally, the filling out of work experience and other details would need to be done as accurately and completely as necessary to make sure work opportunities are not missed.

Figure 15:
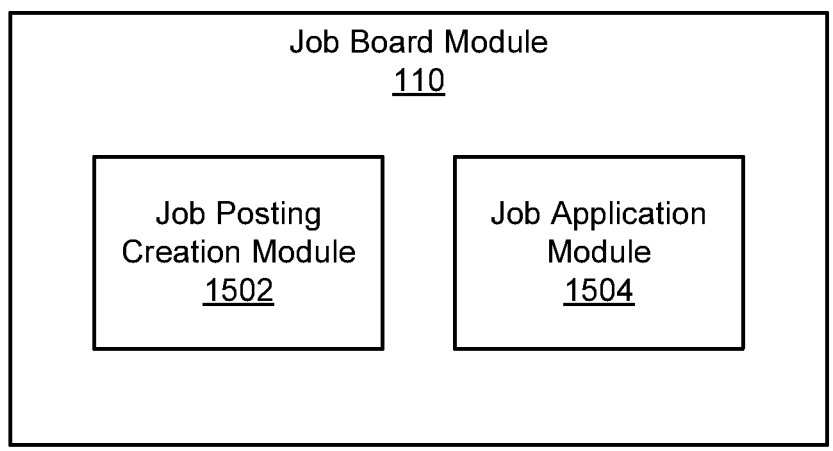
FIG. 15 is a schematic block diagram illustrating one embodiment of a job board module in accordance with the present invention.

FIG. 15 depicts a schematic block diagram of a job board module 110 for providing a job board according to one exemplary embodiment. The job board facilitates the joining of those in need of services or goods with those providing services or goods. In the present embodiment, operation of the job board module 110 will be discussed in relation to assisting customers locate and employ consultants. One of skill in the art will recognize modifications or similarities applicable to other professions or fields for work. The job board module 110 includes a job posting creation module 1502 and a job application module 1504.

The job posting creation module 1502 allows a user of an account, such as a customer account 302, to create a job posting by entering details regarding the job or project. For example, the user can select desirable dashboard attributes and/or work experience categories for applying individuals. According to one embodiment the user can also enter a brief description of the job or project, a short introduction to the potential employer etc. This job posting may then be available for others to view. According to one embodiment, a posted job is available only to a social network. In one embodiment, the job board is integrated into the social network, In one embodiment, the job board may be separate from the social network.

According to one embodiment, only certain types of users can view the job posting. For example, only consultant accounts 304 may be allowed to see job postings. In another example, silo accounts 306 are also allowed to see and apply for job postings. This may be, for example, on behalf of a silo connected to a silo account 306. According to another embodiment, only accounts that have one or more dashboard attributes and/or work experiences that meet the requirements for the job posting can view the job posting. Some embodiments may allow certain accounts to see, but not apply for job postings. For example, only accounts that have one or more dashboard attributes and/or work experiences that meet the requirements for the job posting may be able to apply for the job posting, although all may be able to see the job posting. Additionally or alternatively, customer accounts 302 may be able to see but not apply for job postings.

Jobs posted on the job board may be directed towards obtaining an employee or service provider or any other person looking for work. In one embodiment, the job board may be directed toward obtaining an individual consultant or a full team of consultants to provide services. Once again, consultants and consulting services are exemplary only and a job board may be directed towards any and/or all types of employment. An exemplary job board directed towards consultants and consulting services will now be discussed but one of skill in the art will recognize the broader application of the job board to other professions, fields of work, or a job board in general.

According to one embodiment, a job posting may contain details and requirements needed for a consulting project and the number of individual consultants may be left open. Such a team job posting may allow a variety of individuals having one or more of the requirements in the job posting to apply and the customer can create a team meeting all the requirements for the job posting from the applicants. According to one embodiment, a group of individuals may apply to the job posting as a team. According to another embodiment, a firm may apply for a team job posting on the basis of the attributes and work experience of one or more of its members. In one embodiment, separate individuals or firms may apply for different aspects of the jobs. The job poster may then be able to select one or more applicants to act as a team in fulfillment of the requirements for the job. Thus, the job board module 110 may enable the obtaining of individuals, firms, or custom teams for the performing of a job.

The job application module 1504 provides a job posting page where potential job candidates can view the job posting. The job application module 1504 may provide details of the job posting including requirements and descriptions provided by the job poster. According to one embodiment, the displayed job posting page include indicators that show how well a potential applicant matches up with one or more of the job requirements. According to another embodiment, the job application module 1504 obtains data from a user profile when a user applies for a job posting to create a job application.

Turning now to FIG. 16 an exemplary web page view of a job posting 1600 is shown. The job posting 1600 includes an indicator section 1602, dashboard attributes sections 1604, 1606, and an application option 1608. A potential job applicant may view the job posting 1600 to determining how well he or she matches the job requirements, determining whether he or she is interested, and/or apply for the job posting.

The indicator section 1602 may be similar to the user attributes match section 1404 of FIG. 14. The indicator section 1602 includes one or more indicators 1407 which indicate the degree of match between one or more attributes of the potential job candidate and one or more job requirements for the job posting 1600. Thus, a user looking at the job posting 1600 may be able to quickly determine whether the job posting is compatible with the user's dashboard attributes.

The dashboard attributes sections 1604, 1606 include one or more job requirements that correspond to one or more dashboard attributes. These may be the one or more requirements for the job posting 1600 that are used to produce the indicators 1407 of the indicator section 1602. The job posting 1600 also includes a variety of other sections where additional requirements, descriptions, and/or employer information may be shown. If after viewing the job posting 1600 a potential job candidate decides to apply for the position, the candidate can select the application option 1608 to begin the application process. The application process may include, among other things, a submission of a job application that includes a resume.

FIG. 17 shows an exemplary resume 1700 that may be used to apply for a job posting. The resume 1700 may also be available on a profile of an account. According to one embodiment, the resume 1700 is automatically created by the resume creation module 710 of FIG. 7 when a job applicant selects the application option 1608 of a job posting 1600 (see FIG. 16). The resume 1700 includes an indicator section 1702, a professional introduction section 1704, a professional experience matrix 1706, and a detailed resume 1708.

The indicator section 1702 may be similar to the indicator section 1602 of FIG. 16 in that it shows indicators 1407 reflecting the degree of match between the applicant's attributes and the job posting. According to one embodiment, this section may be dynamically updated in that the indicators are updated every time a job application is accessed. For example, every time an employer access a job application submitted by a job applicant, the indicators are updated to reflect the match between the most recent dashboard attributes of the applicant and the job posting. This may help to limit doctoring the attributes or work experience to coincide with a particular job posting.

The professional introduction section 1704 may be pulled from a user profile of the job applicant or text may be entered and/or edited at the time of application. This section may also be dynamically updated to reflect the most current professional introduction available in a user's profile. The professional experience matrix 1706 may also be pulled from a user's profile. Once again, this section may be dynamically updated. The detailed resume section 1708 may also be pulled from a user's profile. This section may include a similar layout as a traditional resume. Once again, this section may be dynamically updated. The resume 1700 may also include a cover letter section in some embodiments. This may be a text editable field where a user can create a custom letter applicable to the job posting.

According to varying embodiments each of the above sections 1702-1706 may be dynamically updated, may be static, and/or may be editable at the time of application.

In one embodiment, the resume 1700 may be a portion of a job application for applying to a position posted on a job board. In one embodiment, a job application may include one or more details pulled from the profile of a user account on a social network. In one embodiment, the job application may include a user name for a social network account. In one embodiment, the job application may include a resume. In one embodiment, the job application may include one or more indicators. In one embodiment, the job application may include a professional experience matrix. In one embodiment, the job application may include one or more files uploaded by a user, such as a cover letter, professional introduction, detailed resume or other file. In one embodiment, the job application may include one or more multimedia files. In one embodiment, the job application may include one or more links to online web pages and/or files.

Figure 18:
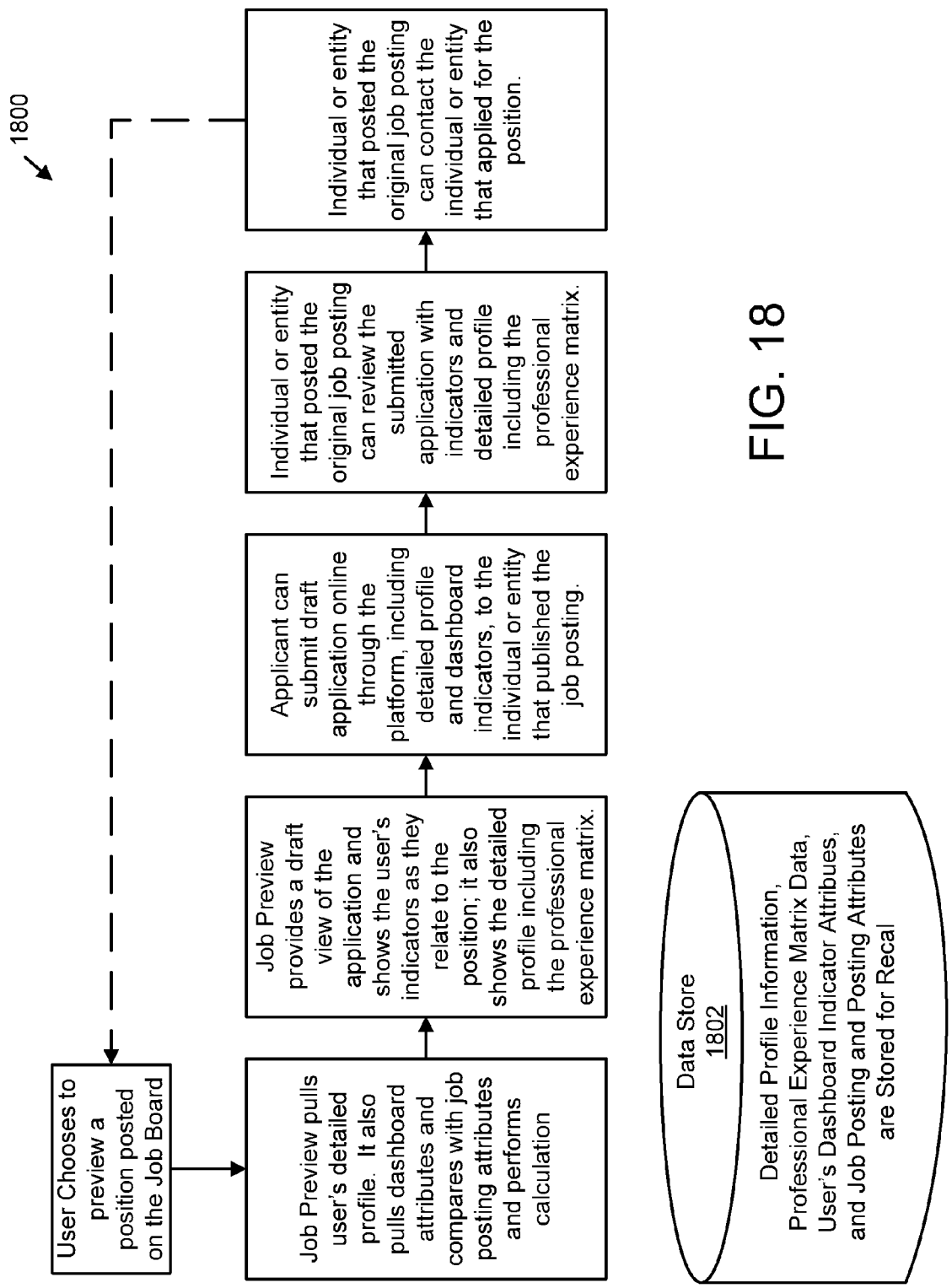
FIG. 18 is a schematic block diagram illustrating exemplary operations of a job board in connection with a social network in accordance with the present invention.

FIG. 18 depicts a schematic block diagram illustrating exemplary operations 1800 a of a job board in connection with a social network. According to the depicted embodiment the job board is in communication with a data store 1802.

Figure 19:
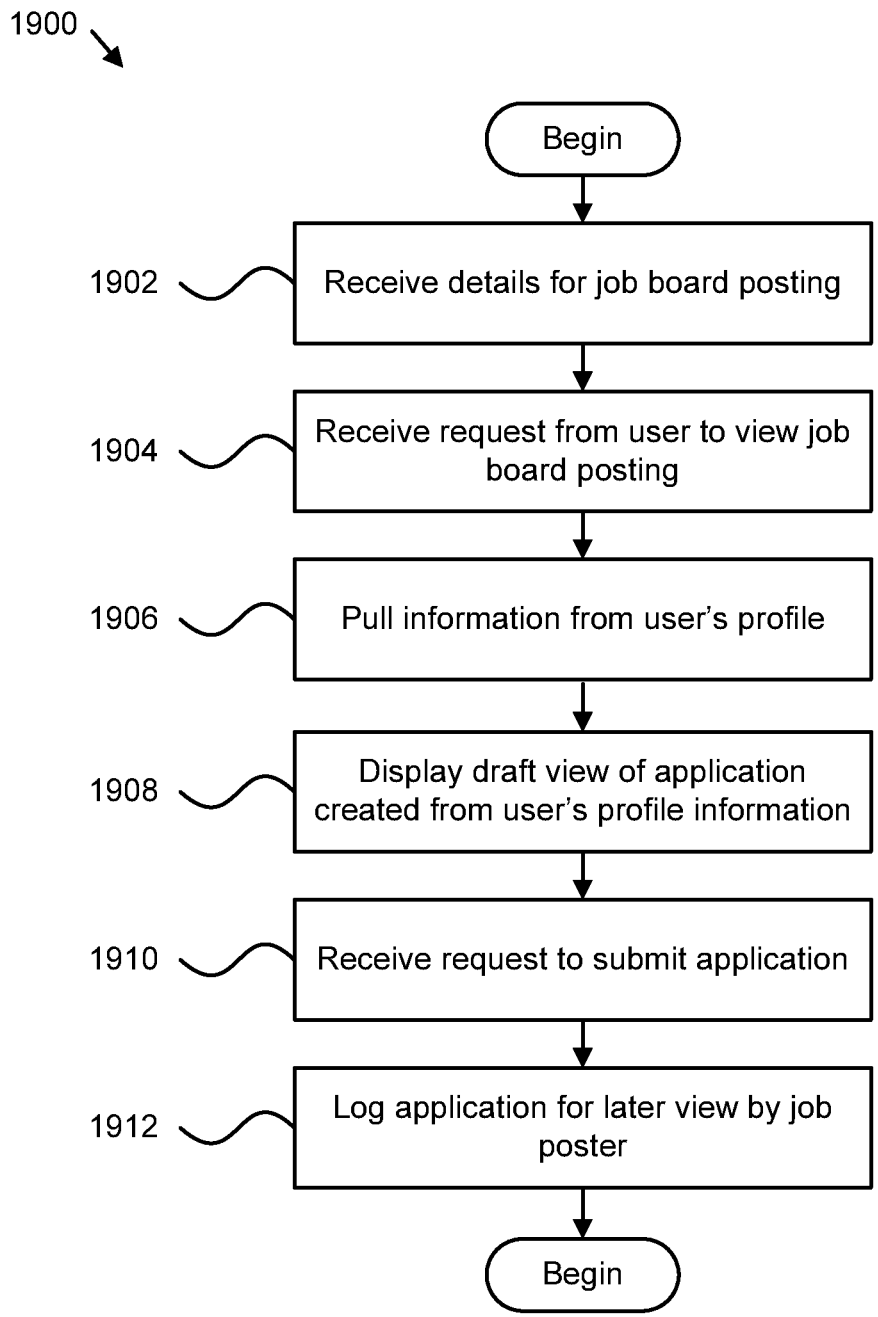
FIG. 19 is a schematic flow chart diagram illustrating an exemplary method of receiving job applications.

FIG. 19 depicts a schematic flow chart diagram illustrating an exemplary method 1900 of receiving job applications. According to one embodiment, the method 1900 may be embodied in instructions by a job board module 110 executable by a processor.

The method 1900 begins and details for a job board posting are received 1902. The details may be received when a user posts a new job board posting. For example, a user may access the social network apparatus 100 remotely over a network and provide details for the job posting. In one embodiment, a system comprising the modules 102-110 provides web pages accessible over the internet for utilizing its functionality.

In one embodiment, the details for the job board posting are received 1902 from a user on an account, such as an account of one of the previously discussed account types 300-306. In one embodiment, the job board posting is posted by a potential customer using a customer account 302 in order to find a consultant to provide services to the customer. In one embodiment, the job board posting is posted by any user having an account on a social network. In other embodiments, the job board posting is posted by a potential employer not necessarily having an account on the social network. In one embodiment, the details for the job board posting were originally entered on a job board external to a social network and then made available for application to users of a social network.

In one embodiment, the job board module 110 provides an interface for entering job board details. In one embodiment, the interface may provide drop down boxes, fields, or any other graphical elements to facilitate organized entry of details of the job posting. The interface may request details regarding desired work experience, desired attributes, or any other qualifications. In one embodiment, a user may enter job board details in a manner similar to that illustrated in FIGS. 8 and 9 in relation to the professional experience matrix. In one embodiment, a user may enter job board details in a manner similar to that illustrated in FIGS. 10 and 11 in relation to dashboard attributes.

After receiving 1902 the details for the job board posting, the job board module 110 may make the job board posting available to be viewed by accounts of a social network.

The job board module 110 may receive 1904 a request to view the job board posting. According to one embodiment, a user of a consultant account 304 searches for and finds the job board posting. The user may request to view the job board posting by selecting a link for the posting.

In response to receiving 1904 the request from the user to view the job board posting, the job board module 110 may pull 1906 information from the requesting user's account profile. The job board module 110 may pull 1906 the user's dashboard attributes, professional experience matrix, and or other information from the user's account profile.

The job board module 110 may display 1908 a draft view of an application created from the user's profile. According to one embodiment, the information from the user's profile may be compared to the details of the job board posting. In one embodiment, the indicator module 106 may display indicators showing how well the user matches up with the job board posting. The draft view of the application displayed 1908 by the job board module may reflect how the application will appear to the job poster. For example, the indicators and information from the user's profile may be displayed similar to a resume of FIG. 17. This may enable the user to understand what the job poster may see if the user posts an application.

In one embodiment, the user may be able to edit one more portions of the draft view of the application. In one embodiment, the user may be able to write a custom professional introduction (such as by modifying the professional introduction section 1704 of FIG. 17) or write or modify a detailed resume (such as the detailed resume field 1708 of FIG. 17). In one embodiment, the user cannot modify some portions of the draft view of the application. For example, a user may not be allowed to modify details in an indicator section 1702 on the draft. The user may be required to update these dashboard attributes in the user's profile instead. As another example, a user may not be able to modify the professional experience matrix section 1706 of the draft.

In one embodiment, a user may be able to select one or more files stored in a user profile for inclusion in a job application. For example, a user may select a file including the text of a resume, one or more multimedia files, or any other file. In one embodiment, the user may be able to select one or more links that link to online files or web pages for inclusion in the job application.

The job board module 110 may receive 1910 a request to submit the application. The user may submit a request when the user is satisfied that the draft application is in condition to be submitted. For example, the user may view the draft view of the application displayed 1908 by the job board module and then request that the application be submitted. The user may request that the application is submitted by selecting a button, link, or any other option on a webpage. The job board module 110 may receive 1910 this request and log 1912 the application for later view by the job poster.

The application may be logged 1912 by saving a version of the application to a data store for later retrieval. In one embodiment, only portions of the application are saved. For example, in the embodiment of FIG. 17 only professional introduction section 1704 and a detailed resume section 1708, and an identifier of the applicants account may be saved. According to one embodiment, portions of the application that are not saved are updated from a user profile of the applicant each time the job poster views the applicant. This may help ensure that the dashboard attributes of a user profile and a professional experience matrix are kept up to date by a user. This may also discourage users from modifying these indicators for a specific position.

In one embodiment, each time the submitted application is viewed one or more aspects of the submitted application may be updated to reflect the profile used to submit the application. For example, the indicators, dashboard attributes, resume, professional experience matrix, or other information may be dynamic such that a change to the account profile will be reflected in job applications submitted before the change was made to the profile. In this manner, job posters may be able to see how the status or attributes of applicants may have changed since they submitted applications for the position.

Figure 20:
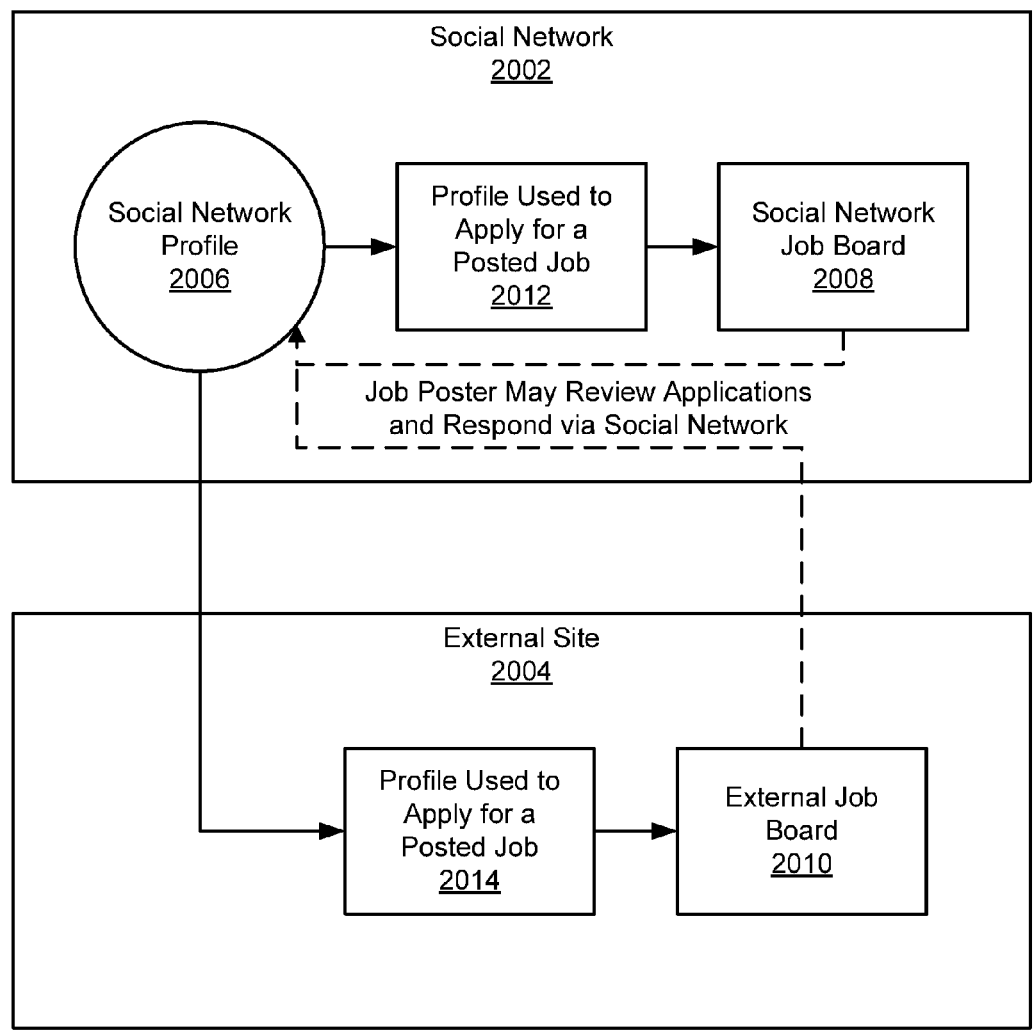
FIG. 20 is a schematic diagram illustrating exemplary use of a social network profile for application to a social network job board and an external job board in accordance with the present invention.

FIG. 20 is a schematic diagram illustrating exemplary use of a social network profile for application to a job board. FIG. 20 depicts a social network 2002 and an external site 2004. In one embodiment, the social network 202 includes a social network profile 2006 and a social network job board 2008. In one embodiment, the external site 2004 includes an external job board 2010.

In one embodiment, the social network profile 2006 is a profile that corresponds to an account on the social network 2002. In one embodiment, the profile corresponds to an individual, team, firm, or group. The profile may include any of the features or variations discussed above. The social network profile 2006 may correspond to an account on a tiered or non-tiered social network. In one embodiment, the social network profile 2006 may correspond to any type of user account.

According to one embodiment, the profile is used 2012 to apply for a job posted on the social network job board 2008. In one embodiment, using the profile to apply may include submitting the profile as at least a portion of a job profile. In one embodiment, information the social network profile 2006 is all that is used as an application for a posted job. In one embodiment, the social network profile 2006 is used 2014 to apply for a job posted on an external site, such as the external job board 2010 of the external site 2004. In one embodiment, In one embodiment, the social network profile

206 may be allowed to apply to jobs posted on both a social network job board 2008 and an external job board 2010.

In one embodiment, a job poster may review applications that include a social network profile 2006. In one embodiment, the job poster may review the applications by accessing a current version of at least a portion of the social network profile 2006. In one embodiment, a portion of the social network profile 2006 is stored in a file that is sent to the job poster.

In one embodiment, the job poster may respond to the job application via the social network. In one embodiment, the job poster may use an account on a social network to send a message to the account corresponding to the social network profile 2006. In one embodiment, the job poster may use information that identifies the social network profile 2006 or corresponding account to send information to the account. In one embodiment, the job poster may be required to have a social network account on the social network 2002 in order to respond to the job application. In one embodiment, the social network may log the submission of an application to the job board and allow the job poster to respond to the applicant(s) without using a social network account. In one embodiment, the job poster may respond to an individual, team, firm, or group that corresponds to the social network profile 2006 through email, phone, or any other communication means.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for submitting a job application on a social network, the method comprising:
   providing, via a computer, a social network comprising a database storing a plurality of accounts and a plurality of connections among the accounts,
   wherein each account comprises a user profile storing a resume and a plurality of network connections, the resume comprising information changeable by the user, wherein the social network allows the forming of connections between specific accounts;
   receiving, via the computer, details for a job posting from a job poster, the job posting corresponding to an employment position;
   providing, via a webpage, a job board comprising a plurality of job postings including the received job posting, the job board in communication with the database and capable of displaying the received job posting to one or more users of a social network, the job board capable of displaying two or more job postings, the one or more users having accounts on the social network;
   receiving, via a webpage, a request from a user of the social network to apply for the employment position corresponding to the received job posting;
   generating one or more indicators that reflect a degree of match between the user's profile and requirements of the employment position;
   creating, via the computer, a job application in response to the request to apply for the employment position, wherein the job application is automatically created from information in the user profile, wherein the job application includes the one or more indicators;
   submitting, via the computer, the job application for viewing by the job poster, the job application comprising at least a portion of the resume and automatically created in response to user instruction, wherein the resume is obtained from the user's profile on the social network by the computer;
   receiving, via a webpage, changes to information in the resume; and
   updating, via the computer, at least a portion of the submitted job application and the one or more indicators to reflect changes made to the resume after submission of the job application.

2. The method of claim 1, wherein the social network comprises the job board.

3. The method of claim 1, wherein the job posting comprises a job posting on a job board independent of the social network.

4. The method of claim 1, further comprising:
   receiving, via a webpage, user data from the user;
   storing the user data in the user's profile; and
   generating, via the computer, the resume by combining the received user data, wherein the received data comprises one or more of work qualification information, work experience information, and a cover letter.

5. The method of claim 1, further comprising:
   displaying a draft view of the job application; and
   allowing the user to modify a portion of the draft view of the job application prior to submission.

6. The method of claim 5, further comprising allowing the user to upload one or more files to be included as part of the job application.

7. The method of claim 1, wherein the submitting of the job application comprises logging an identifier of the user account corresponding to the user.

8. The method of claim 1, wherein the account and the user profile corresponds to a single individual.

9. The method of claim 1, wherein the account and the user profile corresponds to one of a team and a firm.

10. The method of claim 1, wherein the request from the user to apply for the employment position comprises receiving a request from one or more users to apply as a team.

11. The method of claim 10, wherein the job application comprises information from a plurality of user accounts corresponding to the team.

12. The method of claim 1, wherein generating one or more indicators that reflect a degree of match between the user's profile and requirements of the employment position comprises:
   obtaining from the user profile, via the computer, work experience of the user; and
   comparing, via the computer, the user's work experience to details of the job posting.

13. The method of claim 1, wherein the job application comprises one or more media files.

14. The method of claim 1, wherein the job application includes information linking to an online file or website.

15. The method of claim 1, further comprising:
   obtaining from the user profile, via the computer, work experience of the user; and
   comparing, via the computer, the user's work experience to the job posting details,
   wherein the one or more indicators indicate a degree to which the user's work experience matches the job posting details,
   wherein providing the job board comprises displaying the one or more indicators that reflect a degree to which the user's work experience matches the job posting details.

16. An apparatus comprising:
a job application module that receives details for a job posting from a job poster, the job posting corresponding to an employment position;
a network module that manages one or more users having accounts on a social network, the accounts stored in a database;
   wherein each account comprises a user profile storing a resume and a plurality of network connections, the resume comprising information changeable by the user, wherein the social network allows the forming of connections between specific accounts; and
a job board module in communication with the database that:
   provides, via a webpage, the job posting for viewing on a job board by one or more users of a social network, the job board module configured to display two or more job postings,
   receives, via a webpage, a request from a user of the social network to apply for the employment position corresponding to the job board posting,
   creates a job application in response to the request to apply for the employment position, wherein the job application is automatically created from information in the user profile, wherein the job application includes one or more indicators that reflect a degree of match between the user's profile and requirements of the employment position, and
   submits the job application for viewing by the job poster, the job application comprising at least a portion of the resume, wherein the resume is obtained from the user's profile on the social network by a computer, wherein the resume comprises one or more of work qualification information, work experience information, and a cover letter; and
an indicator module that generates the one or more indicators that reflect a degree of match between the user's profile and requirements of the employment position;
wherein the job board module dynamically updates at least a portion of the submitted job application and the one or more indicators, in response to the user changing information in the resume, to reflect changes made to the resume after submission of the job application,
wherein at least a portion of the job application module, the network module, the indicator module, and the job board module comprise one or more of a hardware circuit, a programmable hardware device, and executable code, the executable code stored on one or more computer readable storage media.

17. The apparatus of claim 16, wherein the indicator module:
   obtains work experience of the user from the user profile; and
   compares the user's work experience to details of the job posting,
   wherein the one or more indicators indicate a degree to which the user's work experience matches the details of the job posting, wherein providing the job board further comprises the job board module displaying the one or more indicators that reflect a degree to which the user's work experience matches the job posting details.

18. A computer program product comprising a non-transitory computer readable storage medium storing computer readable program code, the program code, when executed by a processor, cause the processor to perform:
   providing, via a computer, a social network comprising a database storing a plurality of accounts and a plurality of connections among the accounts,
      wherein each account comprises a user profile storing a resume and a plurality of network connections, the resume comprising information changeable by the user, wherein the social network allows the forming of connections between specific accounts;
   receiving, via the computer, details for a job posting from a job poster, the job posting corresponding to an employment position;
   providing, via a webpage, a job board comprising a plurality of job postings including the received job posting, the job board in communication with the database and capable of displaying the received job posting to one or more users of a social network, the job board capable of displaying two or more job postings;
   receiving, via a webpage, a request from a user of the social network to apply for the employment position corresponding to the received job posting;
   generating, via the computer, one or more indicators that reflect a degree of match between the user's profile and requirements of the employment position;
   creating, via the computer, a job application in response to the request to apply for the employment position, wherein the job application is automatically created from information in the user profile, wherein the job application includes the one or more indicators;
   submitting, via the computer, the job application for viewing by the job poster, the job application comprising at least a portion of the resume and automatically created in response to user instruction, wherein the resume is obtained from the user's profile on the social network by the computer;
   receiving, via a webpage, changes to information in the resume; and
   dynamically updating, via the computer, at least a portion of the submitted job application and the one or more indicators to reflect changes made to the resume after submission of the job application.

19. The computer program product of claim 18, wherein the user corresponds to one of a team and a firm, the resume comprising one or more of work qualification information, work experience information, and a cover letter for the one of a team and a firm.

20. The computer program product of claim 18, the program code further causing the processor to perform:
   obtaining work experience of the user from the user profile; and
   comparing the user's work experience to details of the job posting,
   wherein the one or more indicators indicate a degree to which the user's work experience matches the details of the job posting, wherein providing the job board further comprises the displaying the one or more indicators that reflect a degree to which the user's work experience matches the job posting details.

* * * * *